(12) United States Patent
Galor Gluskin et al.

(10) Patent No.: US 10,387,477 B2
(45) Date of Patent: Aug. 20, 2019

(54) CALIBRATION FOR PHASE DETECTION AUTO FOCUS (PDAF) CAMERA SYSTEMS

(71) Applicant: QUALCOMM Incorporated, San Diego, CA (US)

(72) Inventors: Micha Galor Gluskin, San Diego, CA (US); Jisoo Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 15/608,027

(22) Filed: May 30, 2017

(65) Prior Publication Data

US 2018/0349378 A1 Dec. 6, 2018

(51) Int. Cl.
| | | |
|---|---|---|
| G06F 16/432 | (2019.01) | |
| G03B 13/36 | (2006.01) | |
| G02B 7/38 | (2006.01) | |
| H04N 5/232 | (2006.01) | |

(52) U.S. Cl.
CPC ............. *G06F 16/434* (2019.01); *G02B 7/38* (2013.01); *G03B 13/36* (2013.01); *H04N 5/232* (2013.01)

(58) Field of Classification Search
None
See application file for complete search history.

(56) References Cited

U.S. PATENT DOCUMENTS

| | | | |
|---|---|---|---|
| 9,420,164 B1 | 8/2016 | Galor et al. | |
| 2009/0073277 A1* | 3/2009 | Numata | H04N 19/139 |
| | | | 348/222.1 |
| 2010/0013947 A1 | 1/2010 | Oikawa | |
| 2010/0103323 A1* | 4/2010 | Wredenhagen | H04N 5/145 |
| | | | 348/699 |
| 2012/0147238 A1* | 6/2012 | Kita | H04N 5/23212 |
| | | | 348/302 |
| 2015/0130987 A1* | 5/2015 | Nakagawa | H04N 5/23212 |
| | | | 348/349 |

(Continued)

FOREIGN PATENT DOCUMENTS

JP 2012203278 A 10/2012

OTHER PUBLICATIONS

Jang J., et al., "Sensor-Based Auto-Focusing System Using Multi-Scale Feature Extraction and Phase Correlation Matching", Open Access Sensors doi:10.3390/s150305747, vol. 15, No. 3, 2015, pp. 5747-5762.

*Primary Examiner* — Kevin Ky
(74) *Attorney, Agent, or Firm* — Paradice and Li LLP

(57) ABSTRACT

Methods and apparatuses for calibration of phase detection auto focus (PDAF) camera systems are disclosed. In one aspect, the method involves capturing a first image of a scene at an initial lens position, the first image including a first left image and a first right image captured using left and right photodiodes. The method may also involve calculating an initial phase difference between the first left image and first right image and estimating an in-focus lens position based on the initial phase difference. The method may further involve moving the lens to a final lens position at which a final phase difference between a second left image and a second right image of a second image captured at the final lens position is substantially zero and calibrating the estimation of the in-focus lens position based on the initial lens position, the final lens position, and the initial phase difference.

26 Claims, 19 Drawing Sheets

(56) References Cited

U.S. PATENT DOCUMENTS

| | | | |
|---|---|---|---|
| 2015/0215545 A1* | 7/2015 | Hayashi | G02B 7/28 |
| | | | 348/240.3 |
| 2015/0381883 A1* | 12/2015 | Kawai | H04N 5/23293 |
| | | | 348/333.08 |
| 2016/0042526 A1 | 2/2016 | Lee et al. | |
| 2016/0088218 A1* | 3/2016 | Kikuchi | G02B 7/28 |
| | | | 348/231.6 |
| 2016/0191824 A1* | 6/2016 | Izawa | G02B 7/34 |
| | | | 348/251 |
| 2017/0090149 A1* | 3/2017 | Galor Gluskin | G02B 7/285 |
| 2017/0142325 A1* | 5/2017 | Shimokawa | G02B 7/28 |
| 2017/0214845 A1* | 7/2017 | Ohara | H04N 5/23212 |
| 2018/0007253 A1* | 1/2018 | Abe | H04N 5/2254 |
| 2018/0120687 A1* | 5/2018 | Jiang | G02B 7/28 |
| 2018/0152651 A1* | 5/2018 | Matsunaga | H04N 5/3696 |
| 2018/0176452 A1* | 6/2018 | Nikkanen | H04N 5/23212 |
| 2018/0324359 A1* | 11/2018 | Pan | H04N 5/23267 |

* cited by examiner

CALIBRATION FOR PHASE DETECTION AUTO FOCUS (PDAF) CAMERA SYSTEMS

TECHNICAL FIELD

The present application relates generally to digital image processing, and more specifically, to methods and systems for adaptive calibration of phase detection auto focus (PDAF) imaging systems.

BACKGROUND

Imaging devices may include an auto focus (AF) system to aid a user of the imaging device in focusing a scene. There are a number of techniques for performing AF, such as contrast AF, time of flight (TOF), phase detection (PDAF), and stereo (DCIAF). The calibration of such AF techniques may be performed at production time; however, production time calibration may have limitations in terms of cost, accuracy, and/or adaptability to environmental conditions. In this context, there remains a need for improvement in the speed and/or accuracy of AF techniques to be used in imaging devices.

SUMMARY

The systems, methods and devices of this disclosure each have several innovative aspects, no single one of which is solely responsible for the desirable attributes disclosed herein.

In one aspect, there is provided a method, operable by an imaging device comprising a lens and an image sensor, the image sensor comprising a plurality of pixels, each pixel comprising a left photodiode and a right photodiode. The method may involve: capturing a first image of a scene using the image sensor with the lens at an initial lens position, the first image comprising a first left image captured using the left photodiodes and a first right image captured using the right photodiodes and calculating an initial phase difference between the first left image and first right image. The method may also involve estimating an in-focus lens position based on the initial phase difference; moving the lens to a final lens position at which a final phase difference between a second left image and a second right image of a second image captured at the final lens position is substantially zero; and calibrating the estimation of the in-focus lens position based on the initial lens position, the final lens position, and the initial phase difference.

In another aspect, there is provided an imaging device comprising an image sensor comprising a plurality of pixels, each pixel comprising a left photodiode and a right photodiode; a lens; at least one processor; and a memory. The memory may store computer-executable instructions for controlling the at least one processor to: capture a first image of a scene using the image sensor with the lens at an initial lens position, the first image comprising a first left image captured using the left photodiodes and a first right image captured using the right photodiodes, calculate an initial phase difference between the first left image and first right image, estimate an in-focus lens position based on the initial phase difference, move the lens to a final lens position at which a final phase difference between a second left image and a second right image of a second image captured at the final lens position is substantially zero, and calibrate the estimation of the in-focus lens position based on the initial lens position, the final lens position, and the initial phase difference.

In yet another aspect, there is provided an apparatus comprising means for capturing a first image of a scene using an image sensor of an imaging device, the imaging device comprising a lens, the image sensor comprising a plurality of pixels, each pixel comprising a left photodiode and a right photodiode, the first image captured at an initial lens position, the first image comprising a first left image captured using the left photodiodes and a first right image captured using the right photodiodes and means for calculating an initial phase difference between the first left image and first right image. The apparatus may further comprise means for estimating an in-focus lens position based on the initial phase difference; means for moving the lens to a final lens position at which a final phase difference between a second left image and a second right image of a second image captured at the final lens position is substantially zero; and means for calibrating the estimation of the in-focus lens position based on the initial lens position, the final lens position, and the initial phase difference.

In still yet another aspect, there is provided a non-transitory computer readable storage medium having stored thereon instructions that, when executed, cause a processor of a device to: capture a first image of a scene using an image sensor of an imaging device, the imaging device comprising a lens, the image sensor comprising a plurality of pixels, each pixel comprising a left photodiode and a right photodiode, the first image captured at an initial lens position, the first image comprising a first left image captured using the left photodiodes and a first right image captured using the right photodiodes; calculate an initial phase difference between the first left image and first right image; estimate an in-focus lens position based on the initial phase difference; move the lens to a final lens position at which a final phase difference between a second left image and a second right image of a second image captured at the final lens position is substantially zero; and calibrate the estimation of the in-focus lens position based on the initial lens position, the final lens position, and the initial phase difference.

DETAILED DESCRIPTION

Figure 1A:
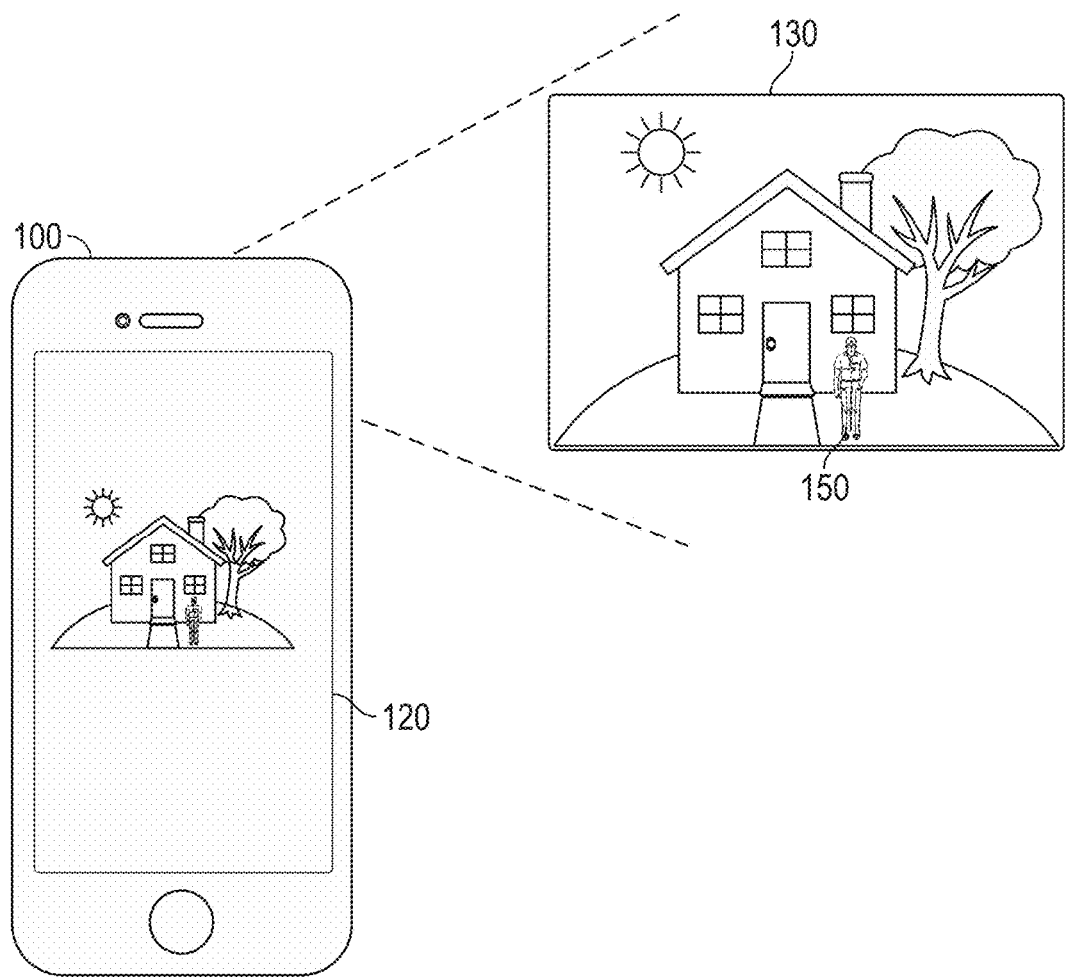
FIG. 1A illustrates an example of an apparatus (e.g., a mobile communication device) that includes an imaging system that can record images of a scene in accordance with aspects of this disclosure.

Digital camera systems or other imaging devices may perform auto focus (AF) to move a lens module of an imaging device so that light captured from a scene is focused on an image sensor. One method for AF is contrast AF, which may be performed based on images captured by the imaging device. Contrast AF may involve determining a focal lens position by adjusting a lens position of the imaging device until a maximum contrast is detected in the captured image. Such contrast AF techniques may require small movements of the lens in order to reliably determine the focal lens position for a given scene. Additionally, contrast AF may be performed without the addition of specialized hardware (e.g., additional pixels and/or sensors) and may be performed using only an image sensor used to capture images.

There are a number of other AF techniques, which may require dedicated hardware, that may complement contrast AF. Such techniques may include, for example, time of flight AF (TOFAF), phase detection AF (PDAF), stereo AF (also referred to as dual camera instant AF (DCIAF)), structured light AF, ultrasound AF, and LIDAR AF. Certain AF techniques may actively measure the distance to an object within the scene and estimate a lens position at which the object will be in-focus (e.g., a focal lens position) based on the measured distance. By estimating the focal lens position, the imaging device may quickly move to the estimated lens position, leading to faster focus time than certain implementations of contrast AF. However, these complementary AF techniques may not be as accurate as contrast AF techniques. For example, when complementary AF techniques are implemented and conform to certain design constraints, such as a cost, power, and/or footprint below a design threshold, these complementary AF technologies may not be able to match the accuracy of contrast AF.

Such complementary AF techniques (hereinafter referred to as auxiliary AF techniques) may be combined with contrast AF techniques to form a hybrid AF process. An auxiliary AF process may be performed to find an estimated focal lens position (e.g., an estimated initial lens position) and after moving the lens to the estimated focal lens position, the contrast AF process may be performed to determine an accurate final focal lens position.

Improvements to the technologies used in auxiliary AF techniques have improved the accuracy of such technologies so as to be comparable with or greater than traditional contrast AF techniques. For example, developments in PDAF sensors have improved the accuracy of certain PDAF technologies such that PDAF can be used to completely replace contrast AF without significantly sacrificing the accuracy of the AF process. Accordingly, certain image sensor applications may use an AF technique other than contrast AF as the sole or main AF process. An example of the improved PDAF technology is dual photodiode (2PD) PDAF sensors. 2PD technology will be described in greater detail below.

The AF process of an imaging device may be calibrated during the production of the imaging device. This may include, for example, calibrating each imaging device based on a template imaging device such that each imaging device receives the same calibration settings. This template calibration may not take into account the manufacturing errors of each individual imaging device, leading to variations in the accuracy of the calibration between the imaging devices. Alternatively, each imaging device may be individually calibrated on the production line. Production line calibration of AF imaging devices may be the norm for certain manufactures since template calibration is not typically reliable enough to provide satisfactory calibration of AF imaging devices. Such individual calibration may be time consuming, resulting in higher production costs. Furthermore, certain environmental conditions, such as the temperature of the imaging device, may affect the calibration settings. That is, when used at temperatures differing from the calibration temperatures, the calibration settings of the imaging device may no longer be sufficiently accurate. Accordingly, individual calibration may not be adaptable to the changing environmental conditions under which the imaging device is used.

The following detailed description is directed to certain specific embodiments. However, the described technology can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Further, the systems and methods described herein may be implemented on a variety of different computing devices that host a camera. These include mobile phones, tablets, dedicated cameras, portable computers, photo booths or kiosks, personal digital assistants, ultra-mobile personal computers, mobile internet devices, security cameras, action cameras, drone cameras, automotive cameras, body cameras, head mounted cameras, etc. They may use general purpose or special purpose computing system environments or configurations. Examples of computing systems, environments, and/or configurations that may be suitable for use with the described technology include, but are not limited to, personal computers (PCs), server computers, hand-held or laptop devices, multiprocessor systems, microprocessor-based systems, programmable consumer electronics, network PCs, minicomputers, mainframe computers, distributed computing environments that include any of the above systems or devices, and the like.

FIG. 1A illustrates an example of an apparatus (e.g., a mobile communication device) that includes an imaging system that can record images of a scene in accordance with aspects of this disclosure. The apparatus 100 includes a display 120. The apparatus 100 may also include a camera on the reverse side of the apparatus, which is not shown. The display 120 may display images captured within the field of view 130 of the camera. FIG. 1A shows an object 150 (e.g., a person) within the field of view 130 which may be captured by the camera. A processor within the apparatus 100 may perform calibration of a hybrid AF process based on the captured image of the scene.

The apparatus 100 may perform calibration of an AF process (e.g., a PDAF process) based on images captured by a user of the apparatus 100. In one aspect, the apparatus 100 may perform calibration based on images captured with AF processes performed during run-time (e.g., while in use by an end-user of the apparatus 100). Aspects of this disclosure may relate to techniques which can improve the calibration of the AF processes of the apparatus 100 compared to production line calibration.

Figure 1B:
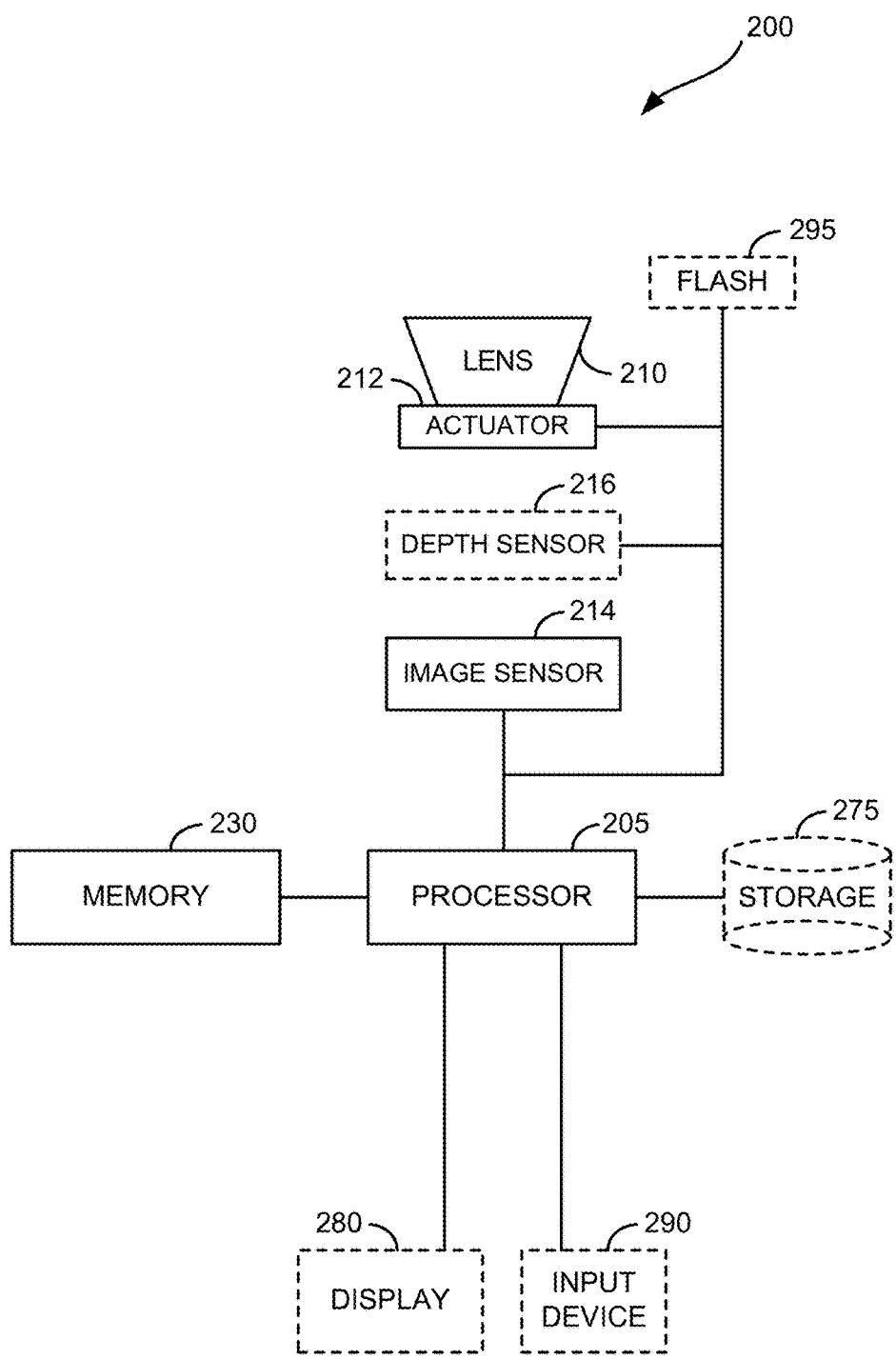
FIG. 1B is a block diagram illustrating an example of an imaging device in accordance with aspects of this disclosure.

FIG. 1B depicts a block diagram illustrating an example of an imaging device in accordance with aspects of this disclosure. The imaging device 200, interchangeably also referred to herein as a camera, may include a processor 205 operatively connected to an image sensor 214, an optional depth sensor 216, a lens 210, an actuator 212, a memory 230, an optional storage 275, an optional display 280, an optional input device 290, and an optional flash 295. In this example, the illustrated memory 230 may store instructions to configure processor 205 to perform functions relating to the imaging device 200. In this example, the memory 230 may include instructions for instructing the processor 205 to perform calibration of AF processes.

In an illustrative embodiment, light enters the lens 210 and is focused on the image sensor 214. In some embodiments, the lens 210 is part of an AF system which can include multiple lenses and adjustable optical elements and may be controllable by the processor 205. In one aspect, the image sensor 214 utilizes a charge coupled device (CCD). In another aspect, the image sensor 214 utilizes either a complementary metal-oxide semiconductor (CMOS) or CCD sensor. The lens 210 is coupled to the actuator 212 and may be moved by the actuator 212 relative to the image sensor 214. The movement of the lens 210 with respect to the image sensor 214 may affect the focus of a captured image. The actuator 212 is configured to move the lens 210 in a series of one or more lens movements during an AF operation, for example, adjusting the lens position to change the focus of an image. When the lens 210 reaches a boundary of its movement range, the lens 210 or actuator 212 may be referred to as saturated. In an illustrative embodiment, the actuator 212 is an open-loop voice coil motor (VCM) actuator. However, the lens 210 may be actuated by any method known in the art including closed-loop VCM, Micro-Electronic Mechanical System (MEMS), shape memory alloy (SMA), piezo-electric (PE), or liquid lens.

The depth sensor 216 is configured to estimate the depth of an object to be captured in an image by the imaging device 200. The depth sensor 216 may be configured to perform a depth estimation using any technique applicable to determining or estimating depth of an object or scene with respect to the imaging device 200, including AF techniques for estimating depth such as TOFAF, laser auto focus, or DCIAF, or other depth sensing technologies such as structured light sensors. Alternatively, the depth sensor 216 may be configured to perform a depth estimation based on a lens position determined by PDAF. The techniques may also be applied using depth or location information received by the imaging device 200 about an object within a scene. Depending on the AF technique employed, the depth sensor 216 may be integrated into other components of the imaging device 200. For example, when using PDAF, the image sensor 214 may include specialized phase detection pixels which may be partially masked. These phase detection pixels may be formed as pairs referred to as "left" and "right" phase detection pixels.

One implementation of a PDAF image sensor is a 2PD image sensor 214. In certain 2PD image sensors 214, each pixel of the image sensor 214 comprises two "dual" photodiodes formed under a microlens. The output of the two photodiodes forming each pixel may be summed to produce an image captured by the image sensor 214. However, during AF, the outputs from the two photodiodes may be independently measured as an indication of the focus of the image. Earlier implementations of PDAF image sensors 214 included specialized phase detection pixels arranged at a certain density within the image sensor 214. In contrast, 2PD image sensors 214 may include the dual photodiodes at each pixel position, increasing the resolution of images taken during AF to the same resolution as the image sensor 214 itself. Accordingly, 2PD image sensors 214 may have a resolution which is about two orders of magnitude greater than the earlier PDAF sensors. Due in part to the increased resolution, 2PD image sensors 214 may provide a focus accuracy that is comparable to and/or greater than contrast AF. Furthermore, since 2PDAF allows for the calculation of a required change in lens position to an in-focus position, 2PDAF may be considerably faster than contrast AF.

Although certain aspects of the present disclosure are described in connection with 2PD sensors 214 and 2PDAF processes, this disclosure is not limited thereto. For example, aspects of the described technology may also apply to other AF processes, including other phase detection image sensors 214 which may be used for AF.

The display 280 is configured to display images captured via the lens 210 and the image sensor 214 and may also be utilized to implement configuration functions of the imaging device 200. In one implementation, the display 280 may be configured to display one or more regions of a captured image selected by a user, via an input device 290, of the imaging device 200. In some embodiments, the imaging device 200 may not include the display 280.

The input device 290 may take on many forms depending on the implementation. In some implementations, the input device 290 may be integrated with the display 280 so as to form a touch screen display. In other implementations, the input device 290 may include separate keys or buttons on the imaging device 200. These keys or buttons may provide input for navigation of a menu that is displayed on the display 280. In other implementations, the input device 290 may be an input port. For example, the input device 290 may provide for operative coupling of another device to the imaging device 200. The imaging device 200 may then receive input from an attached keyboard or mouse via the input device 290. In still other embodiments, the input device 290 may be remote from and communicate with the imaging device 200 over a communication network, e.g., a wireless network (not shown).

The memory 230 may be utilized by the processor 205 to store data dynamically created during operation of the imaging device 200. In some instances, the memory 230 may include a separate working memory in which to store the dynamically created data. For example, instructions stored in the memory 230 may be stored in the working memory when executed by the processor 205. The working memory may also store dynamic run time data, such as stack or heap data utilized by programs executing on processor 205. The storage 275 may be utilized to store data created by the imaging device 200. For example, images captured via image sensor 214 may be stored on storage 275. Like the input device 290, the storage 275 may also be located remotely, i.e., not integral with the imaging device 200, and may receive captured images via the communication network (not shown).

The memory 230 may be considered a computer readable medium and may store instructions for instructing the processor 205 to perform various functions in accordance with this disclosure. For example, in some aspects, memory 230 may be configured to store instructions that cause the processor 205 to perform method 500, method 800, method 900, method 1400, method 1600, method 1800, or portion(s) of the various methods, as described below and as illustrated in FIGS. 4, 7, 8, 14, 16, and 18.

In one implementation, the instructions stored in the memory 230 may include instructions that, when executed, cause the processor 205 to determine lens positions in a range of lens positions of the lens 210. The range may include a desired lens position for capturing an image. The determined lens positions may not include every possible lens position within a range of lens positions, but may include a subset of the possible lens positions within the range of lens positions. The determined lens positions may be separated by a step size of one or more possible lens positions between determined lens positions. For example, the determined lens positions can include a first lens position at one end of the range of lens positions, the first lens position representing a first focusing distance, and a second lens position at the other end of the range of lens positions, the second lens position representing a second focusing distance. The determined lens positions may further include one or more intermediate lens positions, each intermediate lens position representing a focusing distance between the first and second focusing distances, where the determined lens positions are separated by a step size of one or more possible lens positions between the determined lens positions in the range of lens positions. In an illustrative embodiment, the processor 205 may determine lens positions in a range of lens positions based at least in part on an estimation of the depth of an object.

The instructions may also, when executed, cause the processor 205 to determine or generate focus values for images captured at one or more lens positions within the range of lens positions. The desired lens position for capturing an image may be a lens position having a maximum focus value. The instructions may also, when executed, cause the processor 205 to determine or generate a focus value curve or data representative of a focus value curve based on the determined or generated focus values. The instructions may also, when executed, cause the processor 205 to determine lens positions in a search range of lens positions based at least in part on generated focus values or a focus value curve or data representative of a focus value curve based on a previous search range of lens positions.

Hybrid AF Techniques

Figure 2:
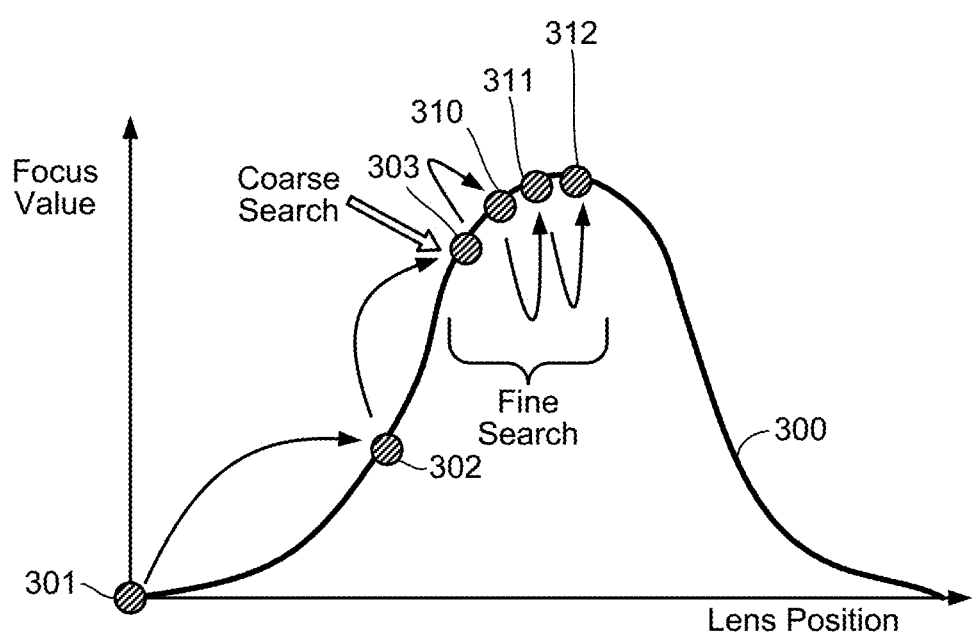
FIG. 2 is a graph illustrating an example of a hybrid AF process including coarse and fine searches.

FIG. 2 provides a graph illustrating an example of a hybrid AF process including coarse and fine searches. The graph of FIG. 2 includes a curve 300 representing a focus value (e.g., a contrast value obtained using a contrast AF technique) for a captured image according to various lens positions. The hybrid AF process may include a coarse search performed by an auxiliary AF process and a fine search performed by a main AF process. The coarse search may include moving the lens to lens positions 301, 302, and 303. However, the lens positions 301 to 303 illustrated in FIG. 2 are merely examples and in other implementations, the auxiliary AF process may move directly from the start lens position 301 to an estimated initial lens position, such as lens position 303.

Once the lens has moved to the estimated initial lens position 303, the hybrid AF process may include performing the main AF process in order to perform the fine search. The fine search may include a contrast AF process where the lens position is moved from the estimated initial lens position 303 to lens positions 310, 311, and 312. The main AF process may determine that the maximum contrast occurs at lens position 312, and thus, the hybrid AF process may be completed by terminating the movement of the lens at a final lens position 312. Due to the movement of the lens to the initial lens position by the auxiliary AF process, the hybrid AF process may be more efficient than a main AF process performed alone. For example, a contrast AF process may initially overshoot the final lens position 312 and then return to the final lens position 312 via a number of additional lens movements in a process call focus hunting. This type of focus hunting may be prevented in the hybrid AF process due to the initial movement of the lens to the estimated initial lens position.

The calibration of the auxiliary AF process will now be discussed in connection with FIG. 3. In the description that follows, an implementation where a PDAF technique is used in the auxiliary AF process will be described. However, the disclosed calibration techniques may be performed by any auxiliary AF process that relates a measured optical parameter to a shift in lens position resulting in an estimated focal lens position.

Figure 3:
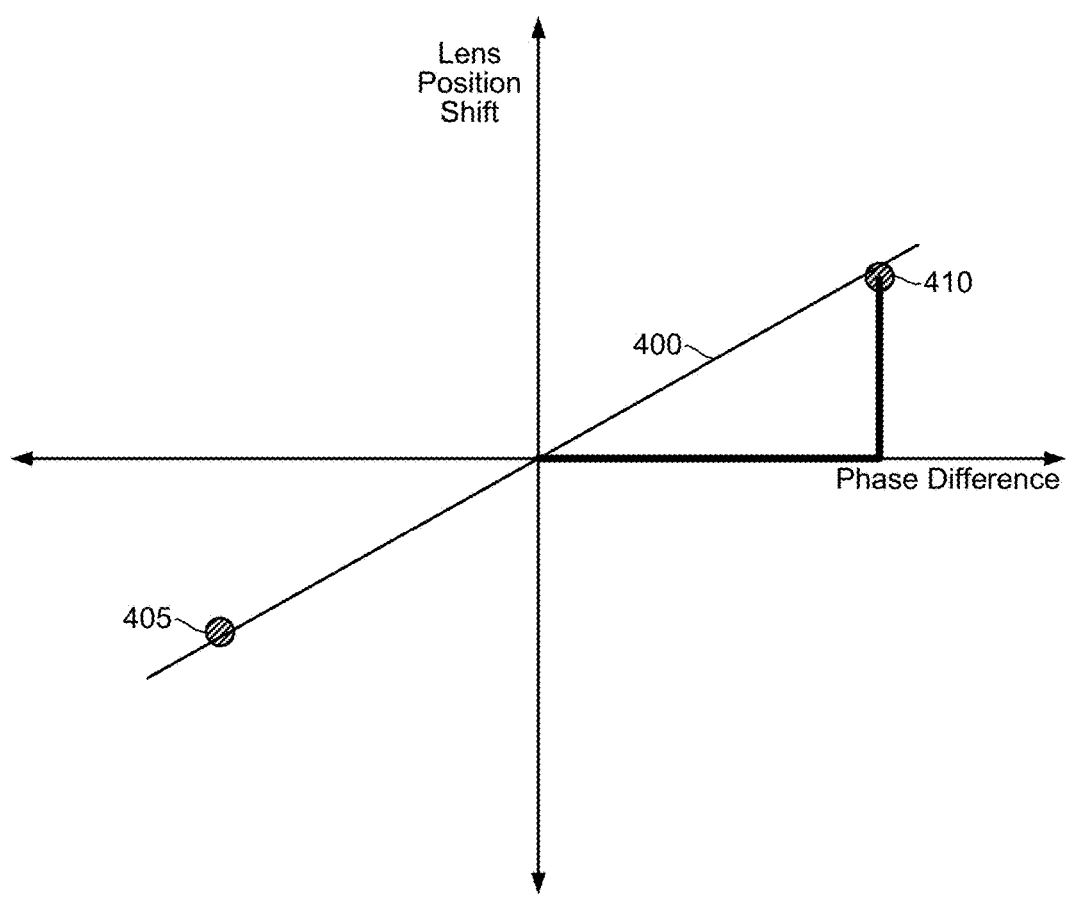
FIG. 3 is graph illustrating an example of an auxiliary AF calibration curve.

FIG. 3 is a graph illustrating an example of a PDAF calibration curve. The calibration curve 400 relates a measured phase difference to an estimated lens position shift that would result in a captured image being in focus. The lens position shift may be a value by which to shift the current lens position to obtain an estimated initial lens position. The measured phased difference may be the phase difference measured between left and right phase detection pixels of the image sensor 214. The calibration curve 400 may be determined at production time. The phase difference may be related to the lens position shift by the following equation:

$$LP = PD * K \qquad (1)$$

where LP is the lens position shift, PD is the measured phase difference, and K is a calibration coefficient.

The PDAF process may thus determine a lens position shift by multiplying the measured phase difference by the coefficient K. An estimated initial lens position may be the current lens position shifted by the lens position shift value. The calibration curve 400, and thus the coefficient K, may vary from device to device and may vary based on environmental conditions such as temperature. As described below, the coefficient K may be determined and/or calibrated at run-time based on image(s) captured by the imaging device 200. Each imaging device 200 may require individual calibration of the coefficient K for an accurate estimation of lens position shift. When calibrated at production time, the calibration coefficient may be stored in the memory 230 or in a specialized one-time programmable (OTP) memory.

Calibration of Auxiliary AF Process

Figure 4:
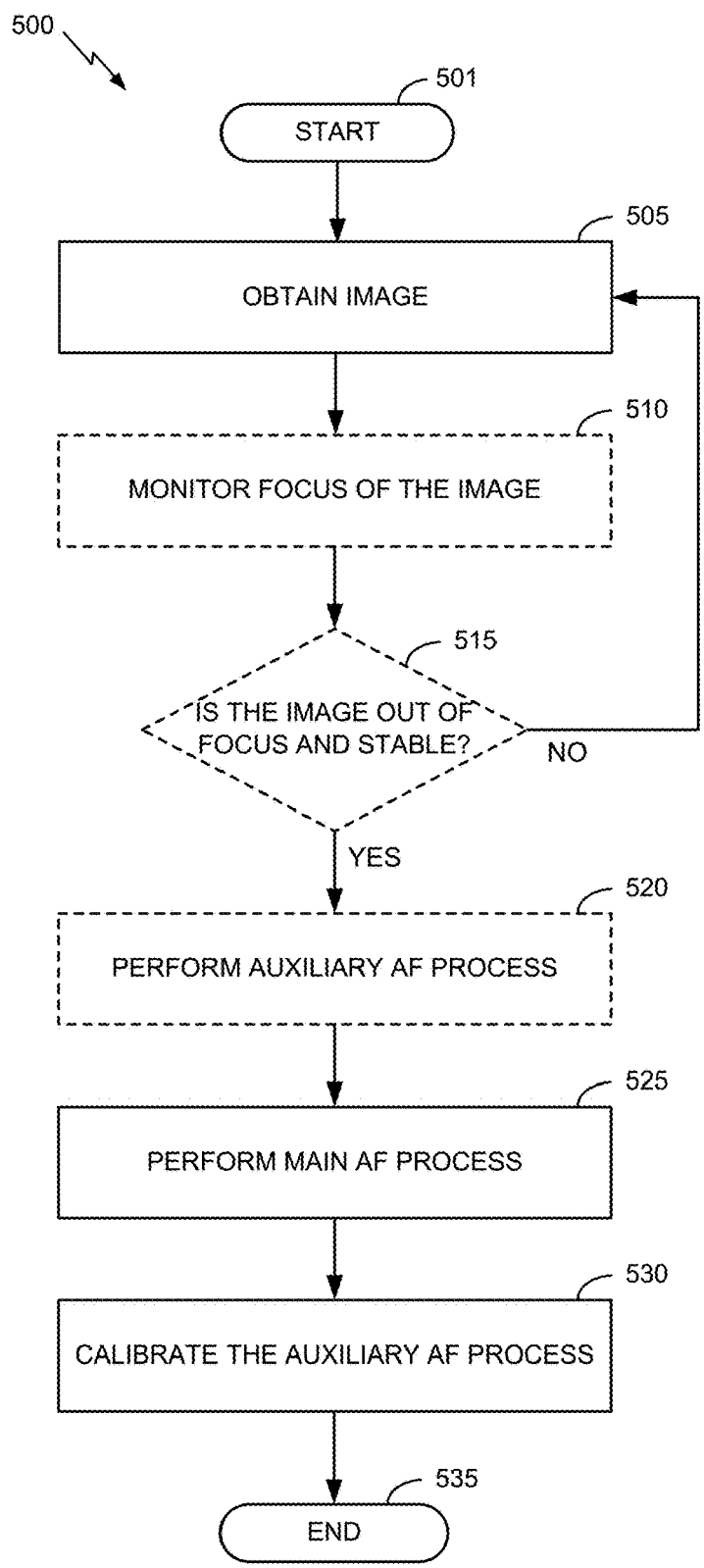
FIG. 4 is a flowchart illustrating an example hybrid AF calibration process in accordance with aspects of this disclosure.

FIG. 4 is a flowchart illustrating an example hybrid AF calibration process in accordance with aspects of this disclosure. The steps illustrated in FIG. 4 may be performed by an imaging device 200 or component(s) thereof. For example, the method 500 may be performed by a processor 205 of the imaging device 200. For convenience, the method 500 is described as performed by the processor 205 of the imaging device 200.

The method 500 starts at block 501. At block 505, the processor 205 obtains an image of a scene from an image sensor 214. The image may be obtained by the image sensor 214 capturing an image through a lens 210. At optional block 510, the processor 205 monitors the focus of the image. For example, at optional block 515, the processor 205 may determine whether the image is out of focus and whether the focus of the image is stable with respect to the focus of previously obtained images. For example, in a PDAF process, the processor 205 may determine that the image is out of focus in response to the phase difference being greater than zero. As used herein, an image may be determined to be stable when the lens position does not change between two successive images captured by the imaging device 200. Conversely, an image may be determined to be unstable when the lens position changes between two successively captured images. Additionally or alternatively, the processor 205 may use the phase difference in determining whether an image is stable. For example, the processor 205 may determine that an image is stable in response to both the lens position and phase difference being the same between two successive images captured by the imaging device 200 and may determine that an image is unstable in response to at least one of the lens position and phase difference being different in two successively captured images. When the image is in focus and/or is unstable, the method 500 returns to block 505 where the processor 205 obtains another image of the scene. Optional blocks 510 and 515 may be performed during a continuous AF implementation. Optional blocks 510 and 515 may be skipped when performing a triggered or single AF process (e.g., after receiving input from a user requiring AF of a scene such as a command to capture an image).

When the image is out of focus and stable or after skipping blocks 510 and 515, the method 500 proceeds to optional block 520, where the processor 205 performs an auxiliary AF process, which may be a coarse focus search. Optional block 520 may be skipped when not performing a hybrid AF process, e.g., when performing a 2PDAF process. The auxiliary AF process may include the processor 205 determining a phase difference based on signals received from left and right phase detection pixels of the image sensor 214. The auxiliary AF process may also include the processor 205 estimating an initial lens position by shifting a current lens position by the product of the measured phase difference and a coefficient K. When the calibration curve or method is not a linear curve as shown in FIG. 3, the processor 205 may estimate the initial lens position by another method as will be described in detail below.

At block 525, the processor performs a main AF process, which may be a fine focus search. The main AF process may include the processor 205 performing a contrast AF process including determining a final lens position at which a captured image is in focus. Alternatively, the main AF process may include the processor 205 performing a 2PDAF process. At block 530, the processor 205 may calibrate the auxiliary AF process or the main AF process based on the final lens position determined during the main AF process. The method 500 ends at block 535. Although not illustrated in FIG. 4, the method may loop back to the start block 501 after the method 500 has ended at block 535 in order to perform a continuous AF process.

Aspects of this disclosure are related to the calibration of an auxiliary AF process based on the results of a main AF process. As described in connection with FIGS. 2 to 4, an auxiliary AF process may allow a hybrid AF process to quickly approach a focal lens position via an auxiliary AF process and determine a final lens position using a more accurate main AF process (e.g., a contrast AF process). Since the auxiliary AF process allows the hybrid AF process to more quickly reach a final lens position, any improvement to the accuracy of the auxiliary AF process reduces the time required for the contrast AF process, and thus, the overall time required for performing the hybrid AF process. As such, aspects of this disclosure relate to improving the calibration of the auxiliary AF process.

One method for calibrating the auxiliary AF process may include comparing the final lens position determined by the main AF process to the estimated initial lens position determined by the auxiliary AF process. When the focal lens position does not change or is substantially the same during both of the auxiliary and main AF processes, the final lens position may indicate an ideal estimate for the auxiliary AF process. For example, the final lens position may be a lens position at which the image captured during the auxiliary AF process would be in focus, and thus, may be used to calibrate the estimation performed by the auxiliary AF process. Accordingly, a plurality of determined final lens positions may be used to calibrate the coefficient K based on the corresponding measured phase differences.

Figure 5:
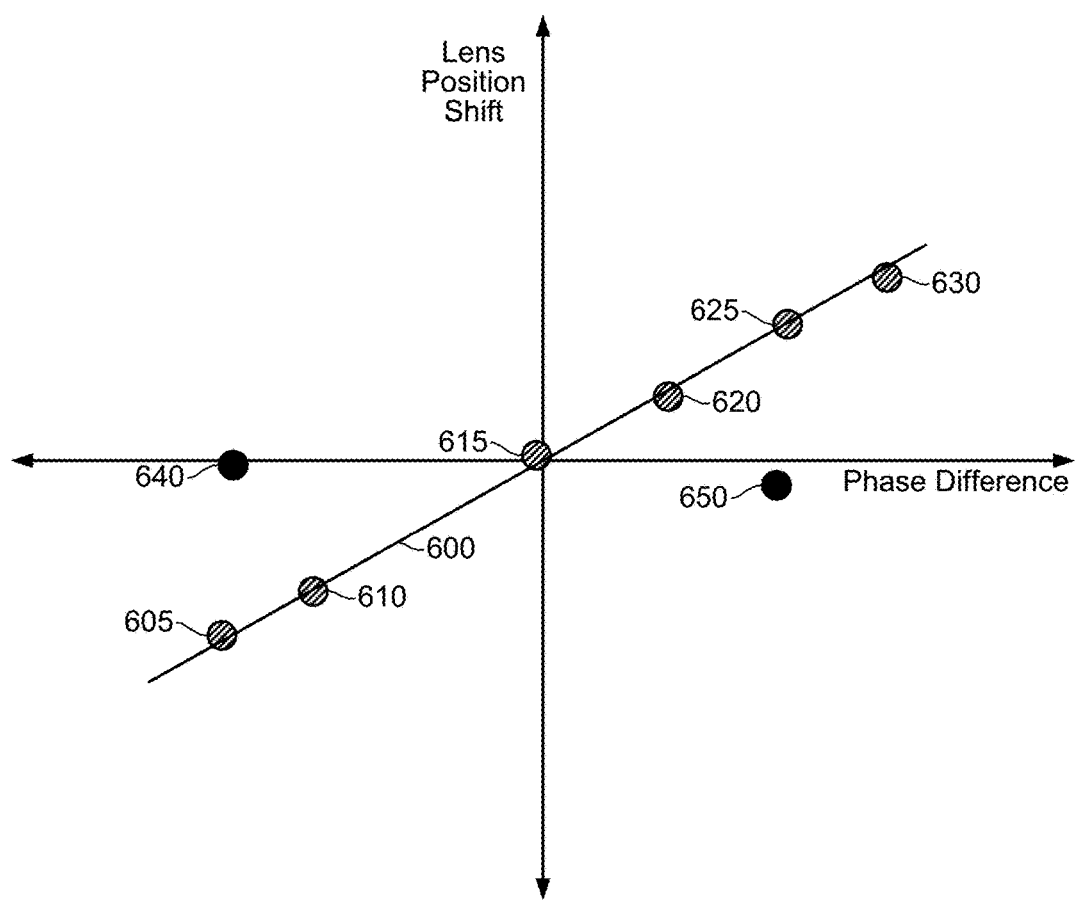
FIG. 5 is a graph illustrating an example calibration curve in accordance with aspects of this disclosure.

FIG. 5 is a graph illustrating an example calibration curve in accordance with aspects of this disclosure. FIG. 5 includes a plurality of lens position shift values 605, 610, 615, 620, 625, 630, 640, and 650 which are plotted against the corresponding measured phase differences. The lens position shift values may be the difference between a starting lens position and a final lens position as determined by a main AF technique. A calibration curve 600 may be determined based on the lens position shift values 605 to 630. For example, the coefficient K of the calibration curve 600 may be determined based on a linear regression of the lens position shift values 605 to 630. Lens position shift values 640 and 650 may be determined as outliers, and thus, may be removed from the samples used in the determination of the coefficient K. In one implementation, a random sample consensus (RANSAC) technique may be used to determine lens position shift values 640 and 650 as outliers from the set of lens position shift values 605 to 650. Since the outlier lens position shift values 640 and 650 may be due to circumstances that are not representative of the accuracy of the auxiliary AF process (e.g., the focal lens position may have changed between the auxiliary AF process and the main AF process), the calibration curve 600 and the coefficient K may be more accurately calculated by omitting the outlier lens position shift values 640 and 650 from the samples used in the calibration of the coefficient K. In other implementations, any other outlier rejection strategy may be used to determine the outlier lens position shift values 640 and 650.

Figure 6:
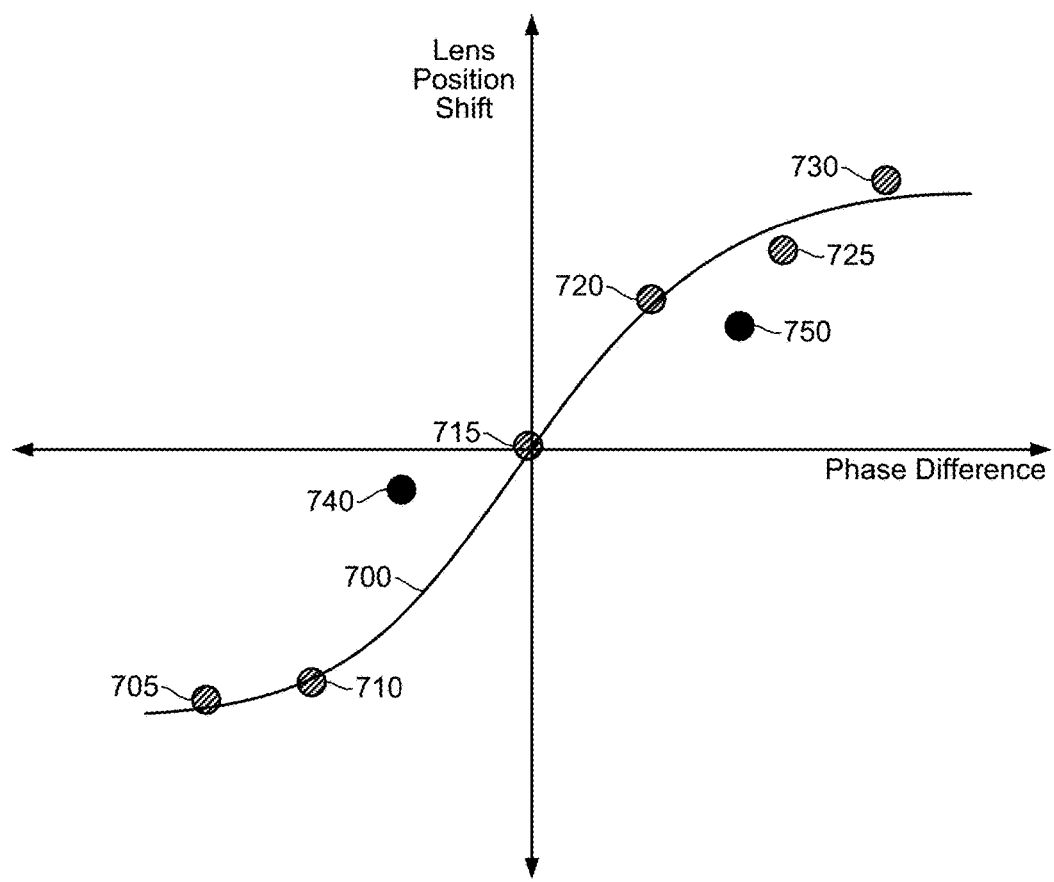
FIG. 6 is a graph illustrating another example calibration curve in accordance with aspects of this disclosure.

FIG. 6 is a graph illustrating another example calibration curve in accordance with aspects of this disclosure. FIG. 6 includes a plurality of lens position shift values 705, 710, 715, 720, 725, 730, 740, and 750 which are plotted against the corresponding phase differences. A calibration curve 700 may be determined based on the lens position shift values 705 to 730. The calibration curve 700 may be fit to a higher-order curve than the linear calibration curve 600 of FIG. 5. Accordingly, the relationship between the lens position shift and the phase difference may be calculated based on the function describing the calibration curve 700.

Due to the run-time or adaptive calibration of the calibration curve 700 described in this disclosure, it may be feasible to fit the sample lens position shift values 705 to 730 to the higher-order curve 700. However, when calibration is performed during production of the imaging device 200, the time requirements to perform higher-order calibration may be prohibitive. For example, the time and cost requirements for capturing multiple images at different focal distances and lens positions during production of an imaging device 200 may be too great to incorporate into imaging device 200 production.

In other implementations, the calibration of the auxiliary AF process may be represented by a 2 dimensional (2D) array. This implementation may be performed in order to take into account multiple inputs. For example, a correction value (e.g., lens position shift value) may be dependent upon the current lens position. Table 1 below illustrates an exemplary 2D array that may be used to relate a measured phase difference and a current lens position to a correction value. When the phase difference falls between entries in the 2D array, a lens position shift may be interpolated based on nearby entries in the 2D array. In Table 1, the left column represents phase difference values, the top row represents lens positions, and the remaining entries are correction values (e.g., lens position shift values). Although Table 1 illustrates the storage of the lens position shift values in the 2D array, other implementations may include the storage of the final lens position data instead of the lens position shift values.

TABLE 1

| Phase Difference | Lens Position | | | |
| --- | --- | --- | --- | --- |
|  | 100 | 200 | 300 | 400 |
| 2 | 20 | 40 | 44 | 50 |
| 1 | 10 | 14 | 18 | 20 |
| 0 | 2 | −1 | 3 | 6 |
| −1 | −10 | −10 | −13 | −15 |
| −2 | −22 | −25 | −25 | −26 |

In certain implementations, other measurements may be used as inputs to determine the correction values. For example, the imaging device 200 may include a thermometer (not illustrated) to determine the operating temperature of the imaging device 200. In other embodiments, the imaging device 200 may obtain temperature information from an external source, for example, the imaging device 200 may obtain temperature information from a weather service via the internet based on location data from a GPS device, a cellular location device, or a Wi-Fi location device. The calibration process may use the measured temperature as an additional input in determining the correction values. This may be implemented via, for example, a 3D array with phase difference, lens position, and temperature as inputs.

Example Flowcharts for Calibration of Hybrid AF Imaging Devices

Figure 7:
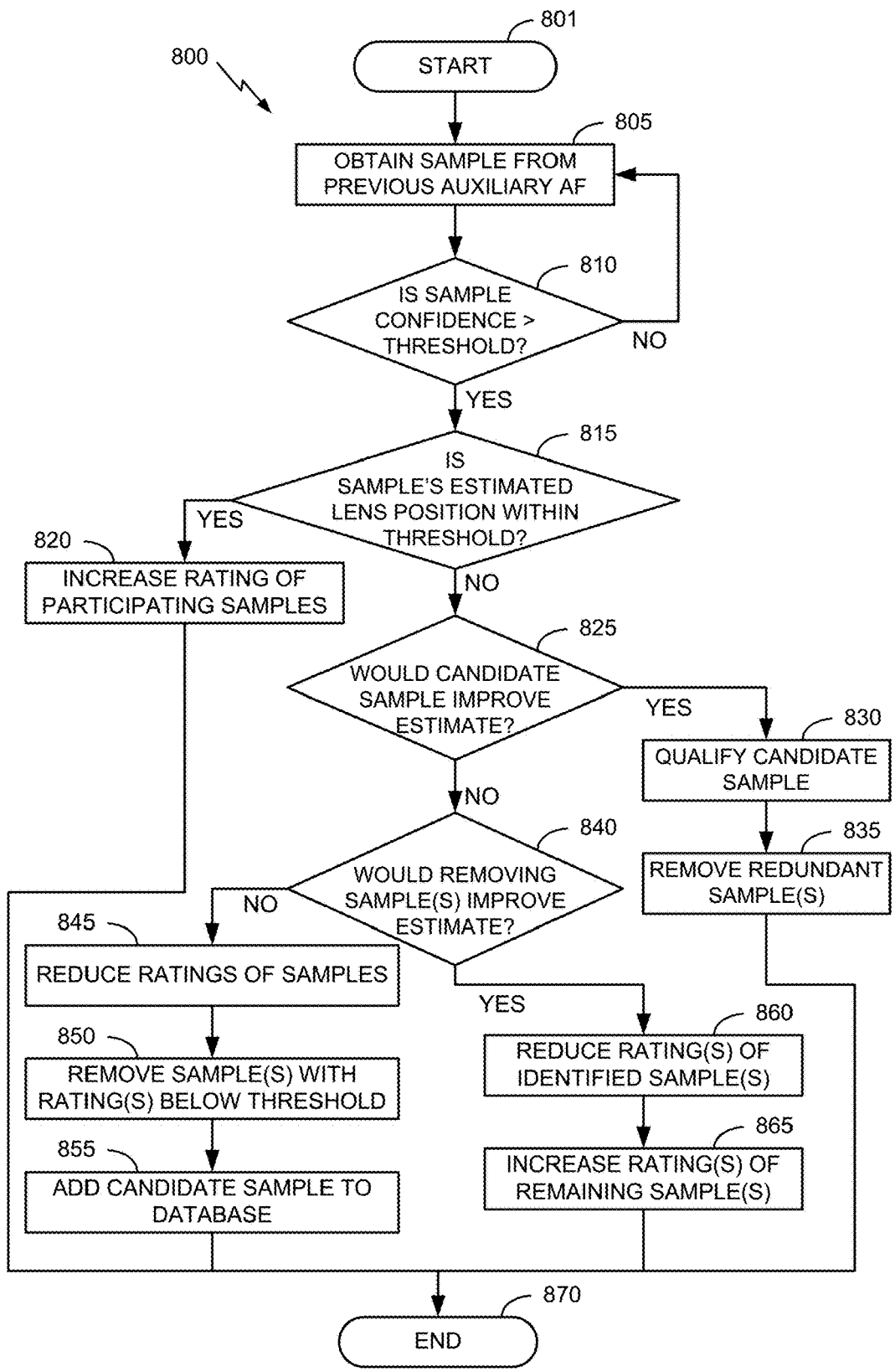
FIG. 7 is a flowchart illustrating an example method operable by an imaging device in accordance with aspects of this disclosure.

An exemplary implementation of this disclosure will now be described in the context of a hybrid AF calibration method. FIG. 7 is a flowchart illustrating an example method 800 operable by an imaging device 200, or component(s) thereof, for calibration of hybrid AF in accordance with aspects of this disclosure. For example, the steps of method 800 illustrated in FIG. 7 may be performed by a processor 205 of the imaging device 200. For convenience, method 800 is described as performed by the processor 205 of the imaging device 200. The method 800 may be included as part of the calibration of the auxiliary AF process of block 540 of method 500 illustrated in FIG. 4.

The method 800 begins at block 801. At block 805, the processor 205 obtains a candidate sample (also referred to simply as a "sample") from a previously performed auxiliary AF process. The sample may include the starting lens position, the value measured by the auxiliary AF process, the final lens position, and a confidence level of the final lens position. Depending on the embodiment, the value measured by the auxiliary AF process may be a measured phase difference for PDAF or a measured distance for DCIAF or TOFAF. The estimated lens position may be determined from the value measured by the auxiliary AF process. Hereinafter, the method 800 will be described with reference to the estimated lens position being included in the sample; however, the value measured by the auxiliary AF process may be substituted for the estimated lens position depending on the implementation of the method 800. The samples may be maintained in a database stored in a memory 230. The samples stored in the database may include "participating" samples (e.g., samples currently used in the calibration of the auxiliary AF process) and "non-participating" samples (e.g., samples not currently used in the calibration of the auxiliary AF process). The confidence level of the final lens position may be determined based on measurements associated with the particular auxiliary AF process being implemented. In DCIAF, the confidence level may be determined based on a number of detected corner points and the matching of the corner points between images. In TOFAF, the confidence level may be determined based on the amount of ambient light and the reflectance of a target object in the scene.

At block 810, the processor 205 determines whether the confidence level of the sample is greater than a threshold confidence level. When the confidence level of the sample is not greater than a threshold confidence level, the method 800 does not store the sample and returns to block 805. When the confidence level of the sample is greater than a threshold confidence level, the method proceeds to block 815, where the processor 205 determines whether the estimated lens position is within a threshold distance from the final lens position determined by the main AF process. As used herein, the estimated lens position may be determined to be within a threshold distance from the final lens position when the difference between the estimated and final lens positions are less than a threshold value. The threshold distance may be a value selected to determine whether the currently participating samples provide an estimate of the lens position that is sufficiently accurate for a given implementation. When the estimated lens position is within the threshold distance from the final lens position, the method proceeds to block 820, where the processor 205 increases a rating associated with each of the participating samples. The ratings associated with the samples may be used to determine which of the samples to include in the participating samples. For example, samples with a rating greater than a threshold rating may be included in the participating samples. As used herein, the threshold rating may be set to any value and may be used as a test for determining whether to include samples in the participating samples. Alternatively, the highest rated samples up to a defined maximum number of samples may be included in the participating samples.

When the estimated lens position is not within the threshold distance from the final lens position, the method proceeds to block 825, where the processor 205 determines whether the candidate sample would have improved the estimation of the estimated lens position (e.g., whether including the candidate sample in the participating samples would have resulted in the estimated lens position being closer to the final lens position). For example, the processor 205 may calculate the value of the estimated lens position including the candidate sample in the participating samples. When the inclusion of the candidate sample in the participating samples results in an estimated lens position that is closer to the final lens position than the lens position estimated without the inclusion of the candidate sample, the processor 205 may determine that the candidate sample would have resulted in the estimated lens position being closer to the final lens position. When the candidate sample would have improved the estimation, the method 800 proceeds to block 830, where the processor 205 qualifies the candidate sample. The qualification of the sample may include adding the candidate sample to the participating samples used in calibrating the auxiliary AF process. In one implementation, there may be a maximum number of participating samples, for example, a maximum of ten participating samples. However, the number of maximum participating samples may be any number of samples depending on the implementation. At block 835, the processor 205 determines whether the qualification of the candidate sample generates any redundancies in the participating samples and removes any redundant sample(s) from the group of participating samples. If the qualification of the candidate sample increases the number of participating sample past the maximum number of participating samples, the processor 205 may select one of the participating samples to be removed.

When the candidate sample would not have improved the estimation of the estimated lens position, the method 800 proceeds to block 840, where the processor 205 determines whether removing sample(s) from the participating samples would have improved the estimation of the estimated lens position. For example, the processor 205 may determine which of the participating sample(s), when removed, would have improved the estimation, and the processor 205 may remove the determined participating sample(s) from the group of participating samples. For example, the processor 205 may calculate the value of the estimated lens position excluding one the samples from the participating samples. When the exclusion of the one of the samples from the participating samples results in an estimated lens position that is closer to the final lens position than the lens position estimated with the inclusion of the one of the samples, the processor 20 may determine that the exclusion of the one of the samples would have resulted in the estimated lens position being closer to the final lens position. This process may also be repeated by excluding more that one of the participating samples at a time. When removing sample(s) from the participating samples would not have improved the estimation of the estimated lens position, the method 800 proceeds to block 845, where the processor 205 reduces the rating of the participating samples. At block 850, the processor 205 removes samples having a rating below the threshold rating from the group of participating samples. At block 855, the processor 205 adds the candidate sample to the group of non-participating samples in the database.

When removing sample(s) from the participating samples would have improved the estimation of the estimated lens position, the method 800 proceeds to block 860, where the processor 205 reduces the rating(s) of the identified sample(s) (e.g., the samples whose removal would have improved the estimation of the estimated lens position). At block 865, the processor 205 increases the rating(s) of the remaining sample(s). The method ends at block 870.

Figure 8:
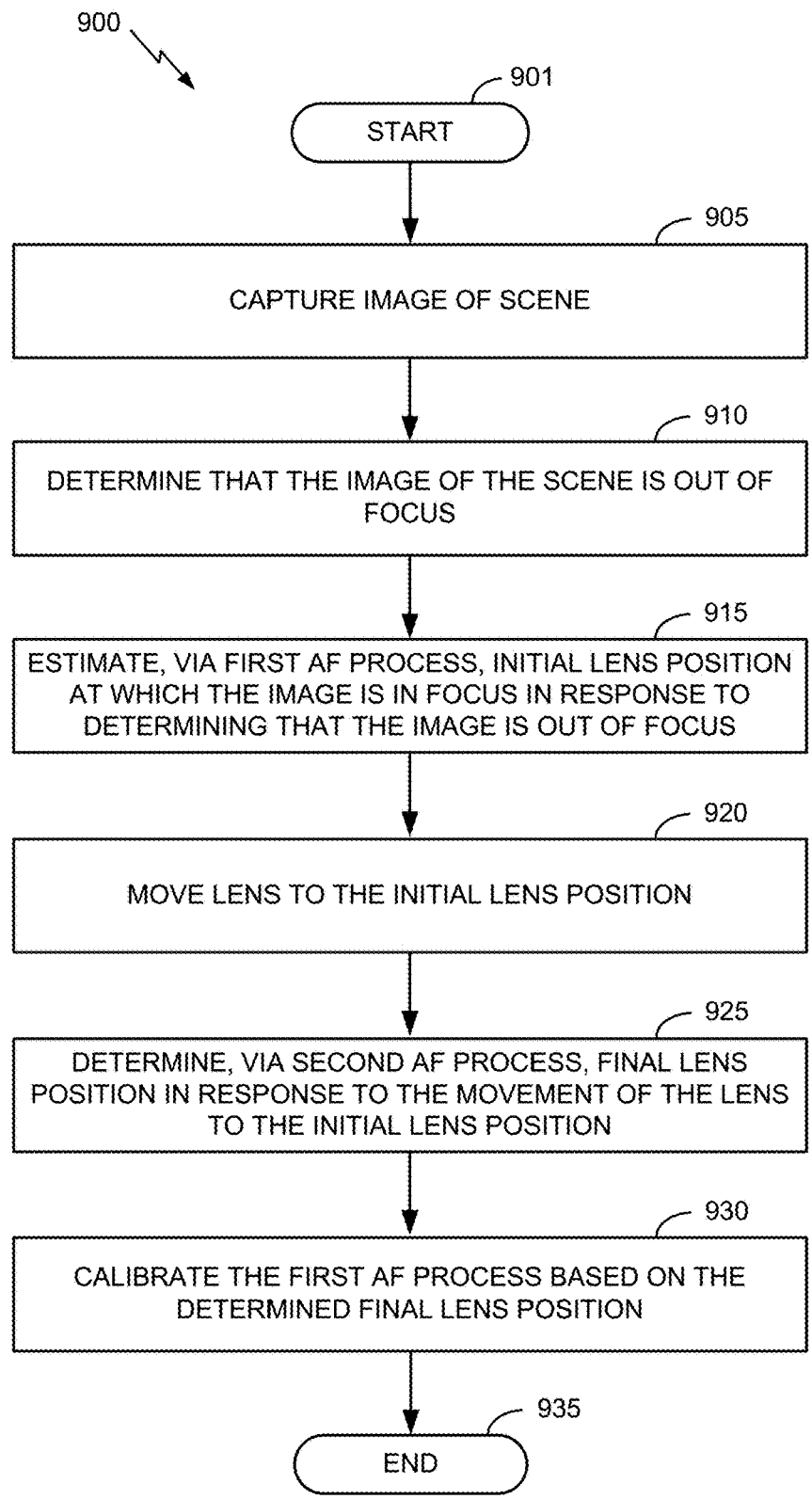
FIG. 8 is a flowchart illustrating another example method operable by an imaging device in accordance with aspects of this disclosure.

FIG. 8 is a flowchart illustrating another example method operable by an imaging device in accordance with aspects of this disclosure. The steps illustrated in FIG. 8 may be performed by an imaging device 200 or component(s) thereof. For example, the method 900 may be performed by a processor 205 of the imaging device 200. For convenience, the method 900 is described as performed by the processor 205 of the imaging device 200. The imaging device may include a lens 210.

The method 900 begins at block 901. At block 905, the processor 205 captures an image of a scene. At block 910, the processor 205 determines that the image of the scene is out of focus. For example, the processor 205 may determine that the image is out of focus via the technique described in connection with block 151 of FIG. 4 above. At block 915, the processor 205 estimates, via a first AF process of a hybrid AF system, an initial lens position at which the image is in focus in response to determining that the image is out of focus. The first AF process may be an auxiliary AF process, for example, a TOFAF process, a PDAF process, or a DCIAF process. At block 920, the processor 205 moves the lens to the initial lens position. At block 925, the processor 205 determines, via a second AF process of the hybrid AF system, a final lens position in response to the movement of the lens to the initial lens position. The second AF process may be a main AF process, for example, a contrast AF process. This may be performed, for example, by the process described above in connection with block 525 of FIG. 4 above. At block 930, the processor 205 calibrates the first AF process based on the determined final lens position. This may be performed, for example, by the process described above in connection with block 530 of FIG. 4 above. The method ends at block 935.

Calibration of 2PD PDAF Camera Systems

As discussed above, calibration of AF systems may be performed during the production of an imaging device 200. However, such production time calibrations may not take into account variations in manufacturing that individually affect a specific imaging device 200 or changes in the environmental conditions of the imaging device 200. Thus, using images captured by the imaging device 200 at run-time to continually update the calibration of the imaging device 200 can improve the accuracy and speed of AF. Aspects of this disclosure relate specifically to the run-time calibration of 2PD PDAF imaging devices 200. Each subsequent image captured using the same PDAF process may use the calibrated process to more accurately and/or efficiently move the lens to an in-focus lens position.

Figure 9A:
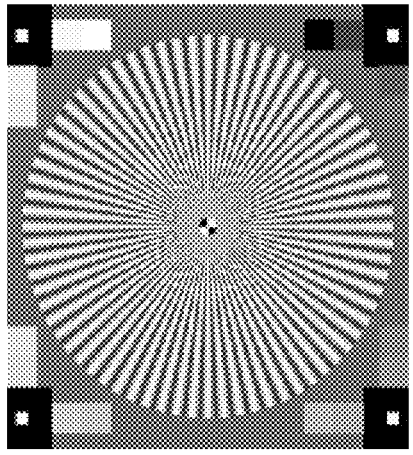
FIGS. 9A-9C provide images taken using a PDAF sensor in accordance with aspects of this disclosure.
Figure 9B:
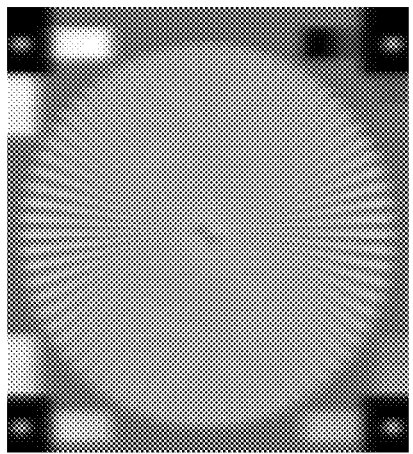
Figure 9C:
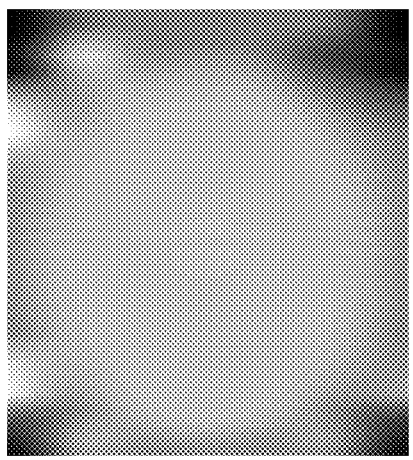

FIGS. 9A-9C provide images taken using a PDAF sensor in accordance with aspects of this disclosure. In particular, the images illustrated in FIGS. 9A-9C may represent images taken by a 2PD image sensor 214 at varying defocus levels. FIG. 9A is an image taken while the 2PD image sensor 214 is in focus (e.g., a defocus value substantially equal to zero), FIG. 9B is an image taken while the 2PD image sensor 214 is out of focus (e.g., a defocus value greater than zero and less than a threshold value), and FIG. 9C is an image taken while the 2PD image sensor 214 is further out of focus than the image of FIG. 9B (e.g., a defocus value greater than the threshold value). The threshold value described in connection with FIG. 9C may be an arbitrary value that distinguishes between the illustrated levels of defocus. In certain implementations, the defocus value may be calculated according to the following equation:

$$\text{Defocus} = K * \text{PD} \tag{2}$$

where Defocus is the defocus value, PD is the measured phase difference, and K is a calibration coefficient. Depending on the embodiment, the calculation of the defocus of the image may be the same as the calculation of the lens position in equation (1) above, or may be a different calculation using a different calibration coefficient.

As used herein, the calibration of the imaging system 200 may generally refer to techniques for improving the estimate of a final lens position, for example, as determined by equation (1) or (2). In certain embodiments, the calibration may include updating the calibration coefficient K based on images captured by the image system 200. For example, a determination as to whether to update the calibration coefficient based on a current image captured using the imaging device 200 may be made for each image captured by the imaging device 200. As discussed in detail below, this determination may be made based on whether updating the calibration coefficient K would have improved the previous estimate of the final lens position (e.g., the lens position at which the image is in focus).

As shown in FIGS. 9A-9C, the edges of the images are more distinct (e.g., sharper) when the image is closer to being in focus, similar to contrast AF. As used herein, image sharpness may refer to a measure of the steepness (e.g., slope) of the transitions between two colors of the image. Additionally, the sharpness of the image may be proportional to correlation between the left and right images taken by the 2PD image sensor 214. This increase in correlation may also lead to an increase in 2PDAF accuracy (e.g., the lens position for the scene being in focus as estimated by the 2PDAF process may increase in accuracy as the lens position moves closer to the focus point).

An AF process performed using a 2PDAF sensor may be similar to the hybrid AF process discussed above in connection with FIGS. 2 and 3. For example, the imaging system 200 may capture a first image of a scene using the image sensor 214 with the lens at an initial lens position. For a 2PDAF system, the first image may include a first left image captured using left photodiodes of the image sensor 213 and a first right image captured using right photodiodes 214.

The processor 205 may estimate initial phase difference between the first left image and first right image. Based on Equation (2), when the measured phase difference PD is substantially equal to zero, the Defocus value is also substantially equal to 0. Accordingly, the focus position of the lens may be determined without any knowledge of the calibration coefficient K. This allows for 2PDAF processes to identify that an image is in focus without relying on the calibration of the coefficient K. For example, even if the calibration coefficient K were incorrectly calibrated, a 2PDAF process can identify a lens position as being in focus when the measured phase difference PD is substantially equal to zero.

Figure 10:
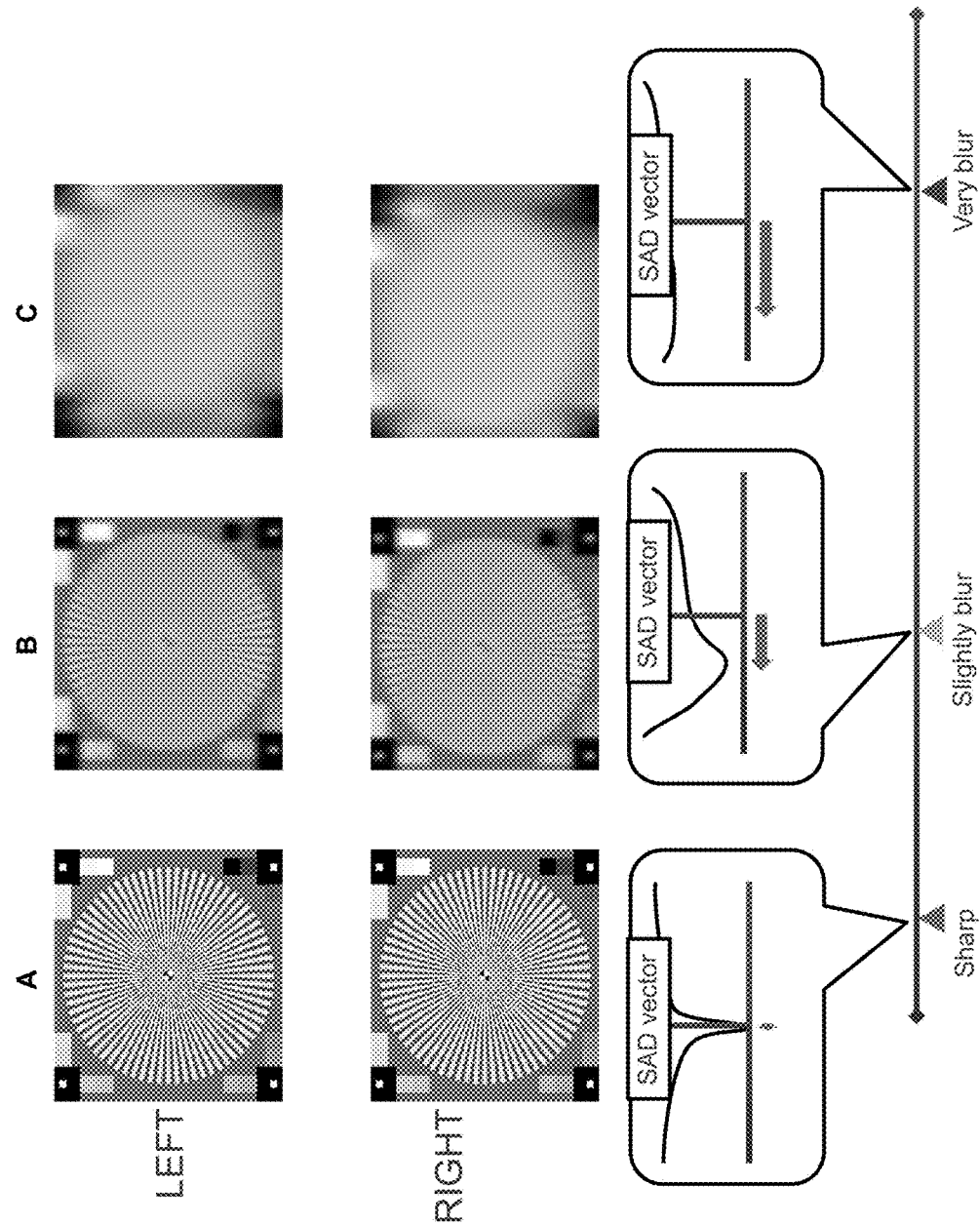
FIG. 10 provides a set of images taken using a PDAF sensor and a set of graphs illustrating corresponding sum of absolute differences (SAD) vectors in accordance with aspects of this disclosure.
Figure 11:
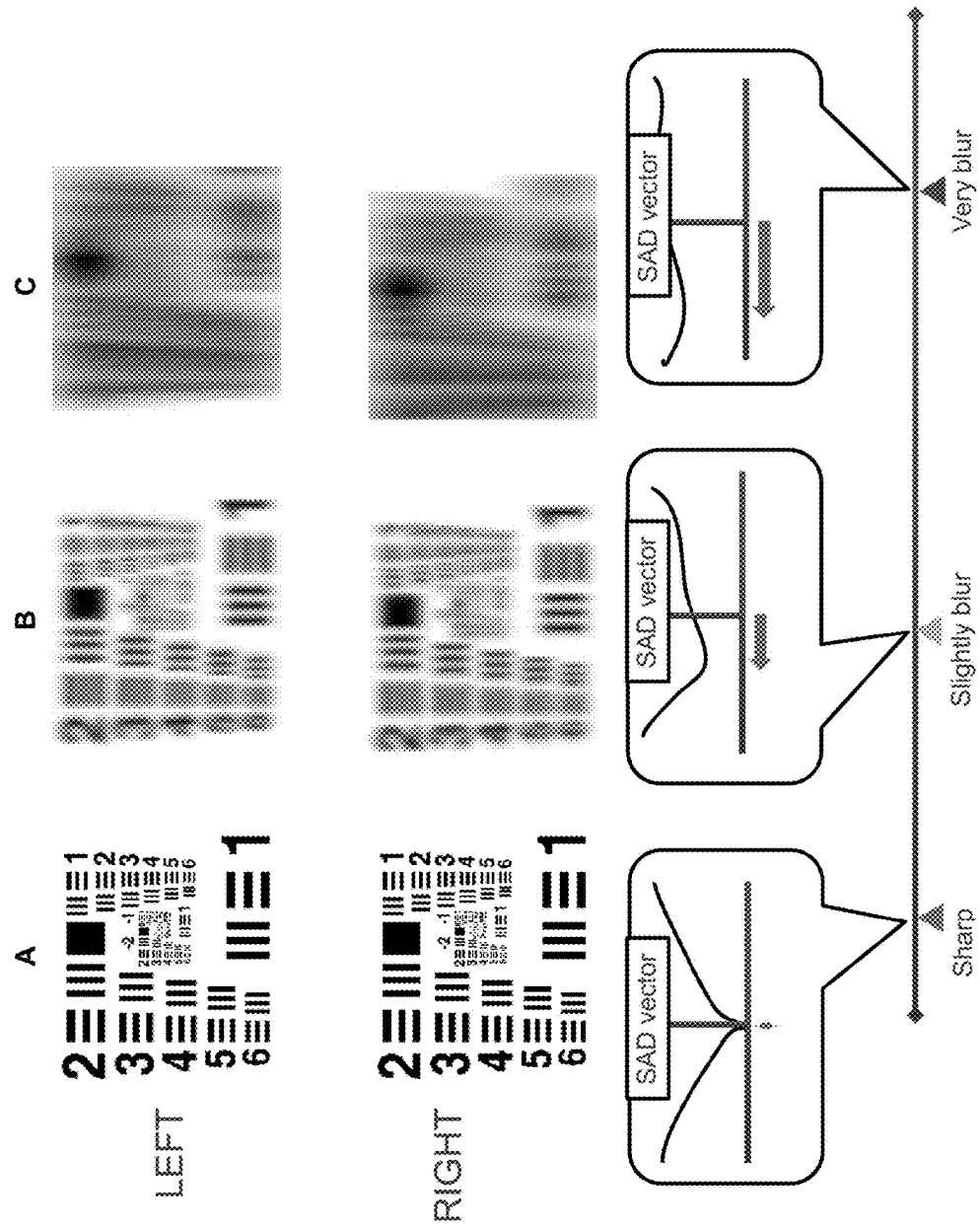
FIG. 11 provides another set of images taken using a PDAF sensor and another set of graphs illustrating corresponding SAD vectors in accordance with aspects of this disclosure.

When the measured phase difference is not substantially equal to 0, the initial phase difference may be used to estimate an in-focus position. The in-focus position may be determined based on estimating a change in lens position LP required to move the image into focus (e.g., via equation (1)). One method for estimating a change in lens position LP required to move an image into focus is via the calculation of a sum of absolute differences (SAD) vector. FIGS. 10 and 11 illustrate left and right images taken by a 2PD image sensor 214 and the corresponding SAD vectors calculated based on the images. The pairs of left and right images are arranged into columns A, B, and C at varying levels of defocus, where the images in column A have very little defocus (e.g., image A is a sharp image), the images in column B have slight defocus (e.g., image B is slightly blurred), and the images in column C have a higher amount of defocus (e.g., image C is very blurred). The arrows overlaid on the SAD vectors in FIGS. 10 and 11 represent the lens position shift and/or the defocus as calculated by equations (1) and/or (2). The direction of the arrow may also be indicative of the required direction of lens shift to move the lens towards a focus position.

Figure 12:
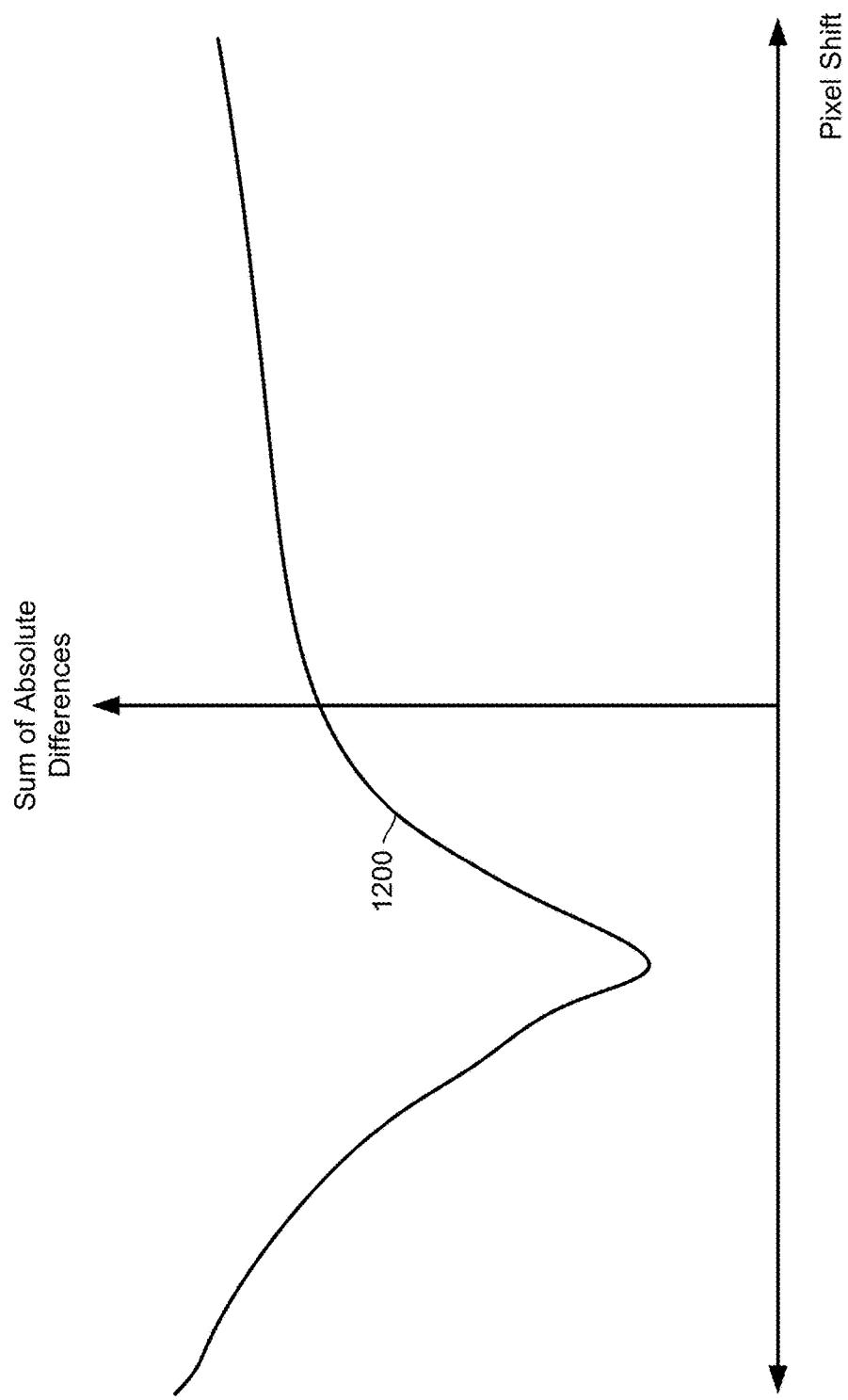
FIG. 12 is a graph illustrating an example SAD vector in accordance with aspects of this disclosure.

FIG. 12 illustrates an exemplary SAD vector in accordance with aspects of this disclosure. The SAD vector may be computed as the sum of absolute differences between each of the corresponding pixels of the left and right images at each of a plurality of difference offset values (e.g., pixel shift values). As used herein, a pixel shift value may refer to the number of pixels that the left and right images are shifted with respect to each other prior to determining and/or calculating a SAD value. For example, for a pixel shift value of zero, the absolute difference between the corresponding pixels of the left and right images are summed together to produce the SAD value at a pixel shift of zero. A SAD value is calculated for each of a plurality of pixel shift values under consideration (e.g., the pixel shift values may range from −16 to +16), and these SAD values are plotted against the corresponding pixel shift values. Thus, the illustrated SAD vectors are a plot of each of the calculated SAD values on the y-axis against the corresponding pixel shift values at which the SAD values were calculated on the x-axis.

The minimum value in the SAD vector may be indicative of the lens position shift LP required to move the image into focus (e.g., the phase difference PD between the left and right images). Accordingly, the SAD vector may be used to determine an initially measured phase difference $PD_0$. For example, the pixel shift value at the minimum of the SAD vector may correspond to an estimated lens position shift LP required to move the image into focus, as described by equations (1) and (2) above. However, the minimum of the SAD vector may not be well defined for images having a high defocus value (e.g., for images that are far from an in-focus lens position). For example, the minimum of the SAD vector may be substantially equal to zero for an in-focus image. Additionally, the shape of the SAD vector near the minimum value may be narrower for an in-focus image than for out-of-focus images, where the width near the minimum value may spread out as the lens position moves away from the focus lens position. A wider SAD vector near the minimum value may be correlated with a higher error in the estimate of the lens position shift LP required to move the image into focus.

The estimated lens position shift LP may be different from the lens position shift $\Delta_{LP}$ in practice due to calibration error and/or the above described limitations in the SAD vector. That is, the final lens position used to capture an image in focus may be a lens position at which a final phase difference between a second left image and a second right image of a second image captured at the final lens position is substantially zero. However, this final lens position may not be the same as the estimated lens position estimated based on the calculated lens position shift LP. As such, it may be desirable to calibrate the estimation of the lens position shift LP based on the final lens position $LP_{focused}$. As discussed above, calculation of the lens position shift may be performed using equation (1) or (2), where the measured phase difference may be calculated using the SAD vector. Thus, calibration of the estimate may include updating the calibration coefficient K using the previously estimated lens position shift LP, the lens position shift $\Delta_{LP}$ in practice, and the phase difference.

The lens position shift $\Delta_{LP}$ may be determined based on the following equation:

$$\Delta_{LP} = LP_{focused} - LP_0 \qquad (3)$$

where $\Delta_{LP}$ is the lens position shift after AF, $LP_{focused}$ is the final lens position after the image is in focus, and $LP_0$ is the initial lens position.

The calibration coefficient K, may be defined based on the lens position shift $\Delta_{LP}$ as follows:

$$K = \Delta_{LP} - PD_0 \qquad (4)$$

where K is the calibration coefficient, $\Delta_{LP}$ is the lens position shift after AF, and $PD_0$ is the initially measured phase difference. Thus, in at least one embodiment, the calibration of the coefficient can be calibrated based on equation (4). For example, the calibration coefficient K may be calculated as the difference between the lens position shift $\Delta_{LP}$ and the initially measured phase difference $PD_0$. Additionally, the lens position shift $\Delta_{LP}$ may be calculated as the difference between the final lens position $LP_{focused}$ and the initial lens position $LP_0$.

The calculated calibration coefficient K may then be used in future PDAF processes to estimate the required change in lens position LP to reach a focused lens position, as in equation (1). Additionally, each measured calibration coefficient K may be used as a candidate sample which may be added to a database of samples used to calibrate the 2PDAF process (e.g., calibration of the process used to estimate an in-focus lens position based on the calculated phase difference). This calibration process may be similar to the process described in connection with FIG. 7. For example, a given sample may be added to the database of participating samples when incorporating the sample into the database would improve the estimation of the change in lens position LP.

Figure 13:
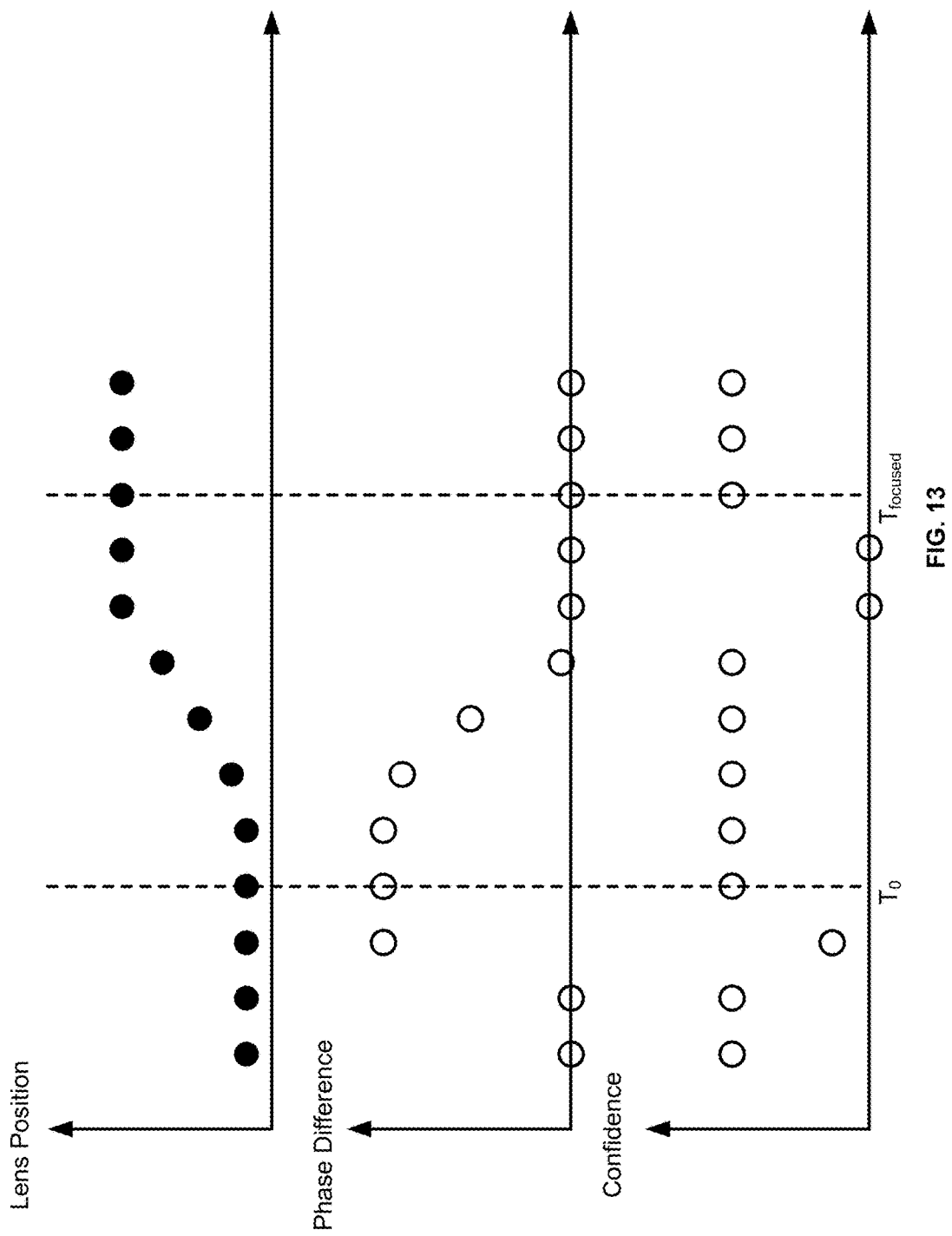
FIG. 13 is a graph illustrating a number of measured parameters in accordance with aspects of this disclosure.

While performing an AF process, the processor 205 may move the lens (e.g., by sending instructions to the actuator 212) at a given frequency (e.g., the position of the lens may be updated at a given time interval). For each lens position LP, the processor 205 may also record the corresponding measured phase difference PD, and a confidence level. An example 2PDAF process including the values determined for each of the lens position LP, phase difference PD, and confidence level measurements is shown in FIG. 13. The determined parameters (e.g., the lens position LP, phase difference PD, and confidence level) may be stored in the memory 230 for a certain length of time. For example, the determined parameters may be stored until a sample calibration coefficient K may be calculated or may be stored until overwritten by a future AF process. Alternatively, the determined parameters may be stored starting from the initiation of a PDAF process, for example, based on an instruction to start the PDAF process received from a user. Thus, the processor 205 may start the recording of the determined parameters (e.g., the lens position LP, phase difference PD, and confidence level) into the memory 230 in response to receiving the instruction to start the PDAF process from the user.

An exemplary method for calculating a sample of the calibration coefficient K will be described in connection with FIG. 13. FIG. 13 is a graph illustrating a number of measured parameters in accordance with aspects of this disclosure. In the example of FIG. 13, the measured phase difference PD starts at a low value which may be substantially equal to zero. As discussed above, this may correspond to the image being in focus. The confidence level may be relatively high for the first two illustrated measurements, in which the phase difference PD and lens position LP are substantially constant. At the third measurement, the phase difference PD changes to a relatively high level, which may be indicative of the image being out of focus. The confidence level immediately after this change in the measured phase difference PD may not be high (e.g., may be less than a threshold confidence level). The threshold confidence level may be any value defined to determine whether a given set of a lens position measurement and a phase difference measurement are sufficiently accurate to be used in calibration of the coefficient K. After the confidence level returns to a level that is greater than a threshold confidence level, the processor 205 may estimate a change in lens position required to move the lens into focus and send instructions to the actuator 212 to move the lens 210. While the actuator 212 is moving the lens towards the instructed lens position, the processor 205 may continue to update the lens position LP, phase difference PD, and confidence level parameters based on corresponding changes in the images captured by the image sensor 214.

Once the phase difference PD returns to a value of substantially zero, the processor 205 may determine that the image of the scene is in focus at the new lens position LP. However, in certain embodiments, the processor 205 may wait until the confidence level is above a threshold confidence level prior to calculating a sample calibration coefficient K. In certain implementations, the processor 205 may use the lens position LP and phase difference calculated at two different points to determine the sample calibration coefficient K.

Figure 14:
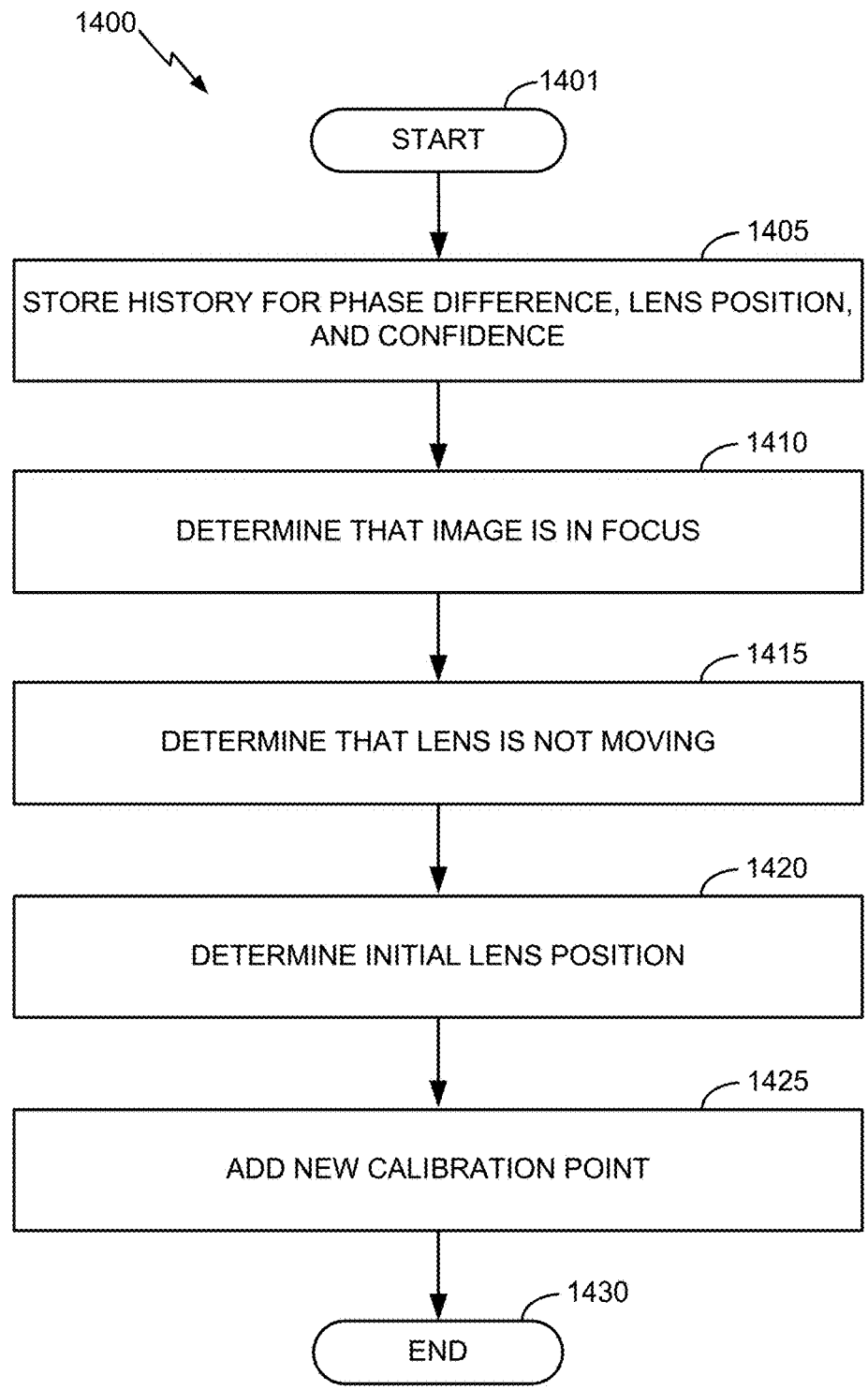
FIG. 14 is a flowchart illustrating an example method operable by an imaging device in accordance with aspects of this disclosure.

One example implementation for selecting two points in time for use in determining a sample calibration coefficient will be discussed with reference to FIG. 14. FIG. 14 is a flowchart illustrating an example method operable by an imaging device in connection with aspects of this disclosure. The method 1400 illustrated in FIG. 14 may be operable by an imaging device 200, or component(s) thereof, for calibration of a 2PDAF process in accordance with aspects of this disclosure. For example, the steps of method 1400 illustrated in FIG. 14 may be performed by a processor 205 of the imaging device 200. For convenience, method 1400 is described as performed by the processor 205 of the imaging device 200. The method 1400 may be included as part of the calibration of the 2PDAF process of block 530 of method 500 illustrated in FIG. 4. The method 1400 begins at block 1401. At block 1405, the processor 205 stores the history for each of the measured parameters (e.g., the lens position LP, phase difference PD, and confidence level) for a certain interval of time. The processor 205 may use the determined parameters at an initial unfocused time $T_0$ and at an in-focus time $T_{focused}$ to determine the sample calibration coefficient K. Accordingly, at block 1410 the processor 205 may determine that the image of the scene is currently in focus. For example, the processor 205 may determine that the image is in focus when the phase difference is less than a threshold phase difference and the confidence level is greater than a threshold confidence level.

At block 1415, the processor 205 may determine that the lens 210 is not moving (e.g., that the lens position LP is not changing). Thus, the processor 205 may select one of the points in time shown in FIG. 13 as a final point in time at which a second image (e.g., an in-focus image) is captured in response to: i) a phase difference being less than a threshold phase difference, ii) a confidence value being greater than a threshold confidence value, and iii) the current lens position being the same as a lens position at a point in time immediately prior to the current point in time. For example, the final time $T_{focused}$ of FIG. 13 illustrates a point in time at which these conditions are satisfied. This may be desirable to remove potential samples where an object in the scene moves between the initial time $T_0$ and the final time $T_{focused}$. For example, the lens position at which the object is in focus will not be constant while the object is in motion, and thus, will not provide accurate data for calibration.

At block 1420, the processor 120 may select a time as an initial time $T_0$ (e.g., an initial unfocused time). Thus, the processor 205 may select one of the points in time shown in FIG. 13 as an initial point in time at which a first image (e.g., the initial time $T_0$) is captured in response to: i) the initial phase difference being a local maximum value, ii) a confidence value corresponding to the initial point in time being greater than the threshold confidence value, and iii) the initial lens position being the same as a lens position at a point in time immediately prior to the initial point in time. For example, the initial time $T_0$ of FIG. 13 illustrates a point in time at which these conditions are satisfied. For example, the processor 205 may find a previous time at which the phase difference PD is at a local maximum value, the confidence level is greater than a threshold confidence level (which may be different than the threshold confidence level of step 1410), and the lens 210 is not moving. After an initial time $T_0$ has been selected, at block 1425, the processor 205 may calculate a sample calibration coefficient K based on the difference between the lens positions at time $T_0$ and time $T_{focused}$ (e.g., the lens position shift $\Delta_{LP}$) and the phase difference at time $T_0$. In one implementation, the processor 205 may use equation (4) to determine the sample calibration coefficient K. The sample calibration coefficient K may be stored in a database, which may be updated, for example, by method 800 illustrated in FIG. 7. The method 1400 ends at block 1430.

In other implementations, the processor 205 may determine the sample calibration coefficient using additional parameters measured at points in time other than at $T_0$ and $T_{focused}$. For example, the processor may determine the phase difference PD as the lens 210 is moved progressively toward the final lens position LP at $T_{focused}$. These additional data points may be used to calculate the sample calibration coefficient K, for example, when the corresponding confidence levels are greater than a threshold confidence level.

In certain implementations, the processor 205 may store the history of the measured parameters starting from when the AF process is initiated. This may correspond to when a user of the imaging device 200 presses (or half-presses) a button to initiate the AF process.

Additionally, the calibration coefficient K may not be a constant value for all scenes. For example, the calibration coefficient K may vary based on the distance between the lens 210 and the object 150. Accordingly, the processor 205 may calculate and maintain a database of calibration coefficients which correspond to differing object 150 distances. The maintenance of the database may include, for each image captured using PDAF, determining a distance from the imaging device to an object in the scene and maintaining a database of calibration coefficients K corresponding to different distances to the object. In this embodiment, a given calibration coefficients K in the database may be updated when the determined distance from the imaging device to the object corresponds to the given calibration coefficient K.

The processor 205 may also maintain a matrix or database of calibration coefficients K corresponding to spatial locations within the frame of an image. That is, the calibration coefficient K may vary based on the location of an object within the image. In this embodiment, the maintenance of the database may include identifying a sub-region of the first and second images containing an object in the scene for which to perform a phase detection auto focus (PDAF) process. The initial phase difference and the final phase difference may be calculated for the identified sub-region. The database may include calibration coefficients corresponding to different sub-regions within the first and second images. Further, calibrating the estimation of the in-focus lens position may include updating a calibration coefficient in the database corresponding to the determined distance from the imaging device to the object.

Calibration of PD Gain Maps

Image sensors 214 may be calibrated for each color channel at production time to correct the uniformity of the output image. This calibration may result in a gain map used to alter the output data received from the image sensor 214 in order to compensate for production defects. That is, the manufacturing process for the image sensor 214 may result in variations in the output data which deviate from the expected output. Production calibration may be performed using selected light sources (e.g., a flat field of light sources) to calibrate the output of the pixels of the image sensor 214 so that the output image data is consistent for a uniform light source. However, this production time calibration may lead to inconsistencies in real usage since real world light sources may not match the conditions of the light sources used for production time gain map calibration.

Figure 15:
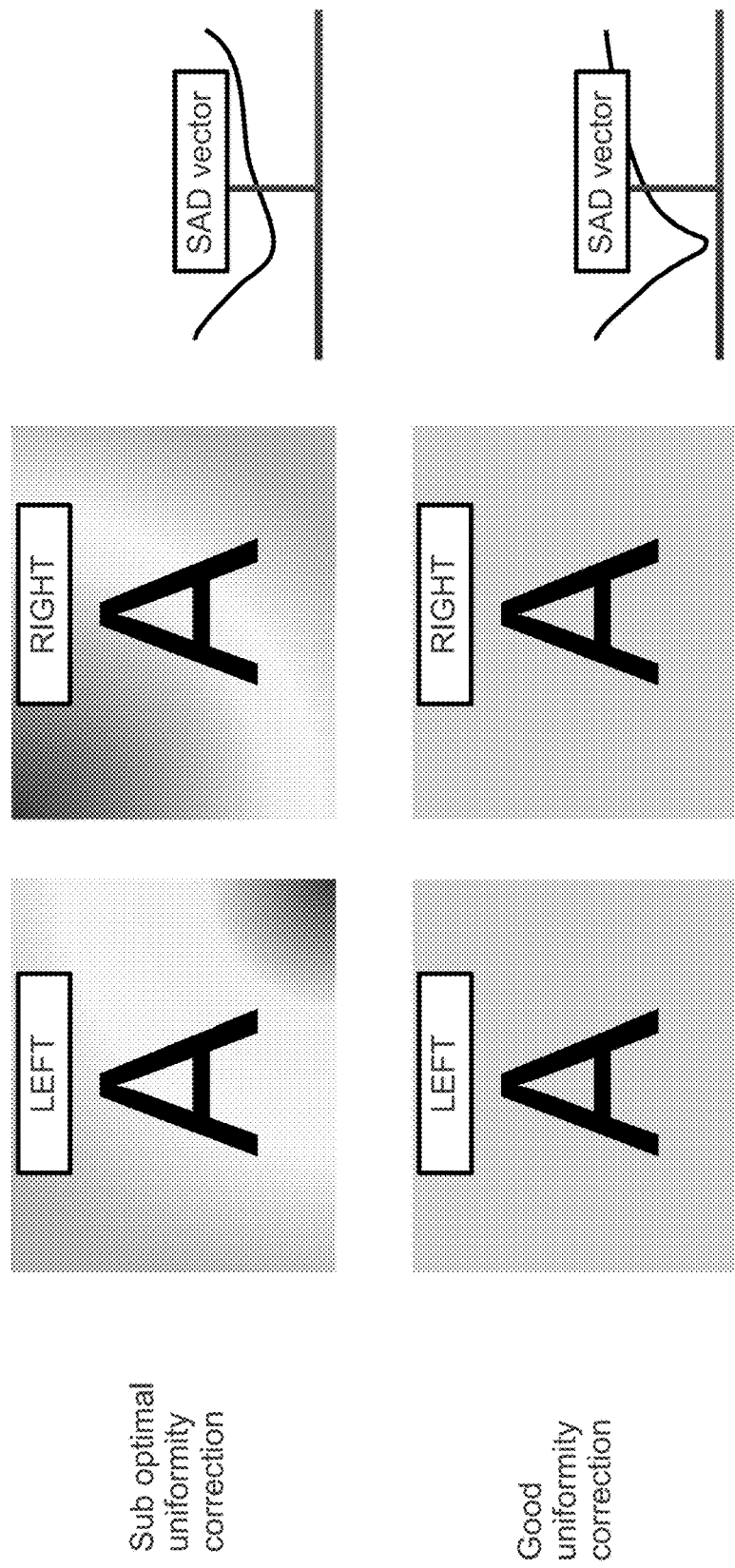
FIG. 15 illustrates a set of gain maps and a set of corresponding SAD vectors in accordance with aspects of this disclosure.

When a given gain map calibration does not produce consistent results for real world conditions, this may result in decreased 2PDAF performance. An example of how gain map calibration affects 2PDAF will be described in connection with FIG. 15. FIG. 15 illustrates two pairs of gain maps and the corresponding SAD vector which may result from the gain maps.

The top row in FIG. 15 includes left and right gain maps which may result from sub-optimal uniformity correction. Since uniformity correction may be performed on each photodiode of the image sensor 214 individually, the gain maps applied to the left and right photodiodes of a given pixel may not be the same. Applying gain maps at the photodiode level may be required for sufficient image quality since manufacturing defects may not be uniform between the left and right photodiodes. However, as discussed above, the gain maps generated at production time may not be applicable under certain real-world conditions. Thus, poor uniformity correction due to these gain maps may produce differing values from the left and right photodiodes of the same pixel, even though the light entering these pixels will be substantially the same. The inconsistencies introduced in the values from the left and right photodiodes of the same pixel due to the sub-optimal gain maps may reduce the quality of a SAD vector calculated therefrom. For example, a SAD vector calculated from images with gain maps having poor uniformity correction may have a poorly-defined and/or wide minimum value compared to a SAD vector produced under the same conditions with gain maps having better uniformity correction. As discussed above, this may negatively affect the accuracy of the 2PDAF process. In contrast, the bottom row of FIG. 15 illustrates gain maps having uniformity correction that is improved compared to the top row. The corresponding SAD vector has a more well-defined and narrower minimum value than the top row. In FIG. 15, variations in the brightness of the images are indicative of poor uniformity, while a constant brightness is indicative of the gain map being uniform. Thus, the gain maps illustrated in the top row of FIG. 15, the gain maps are not uniform while the gain maps illustrated in the bottom row are uniform.

Figure 16:
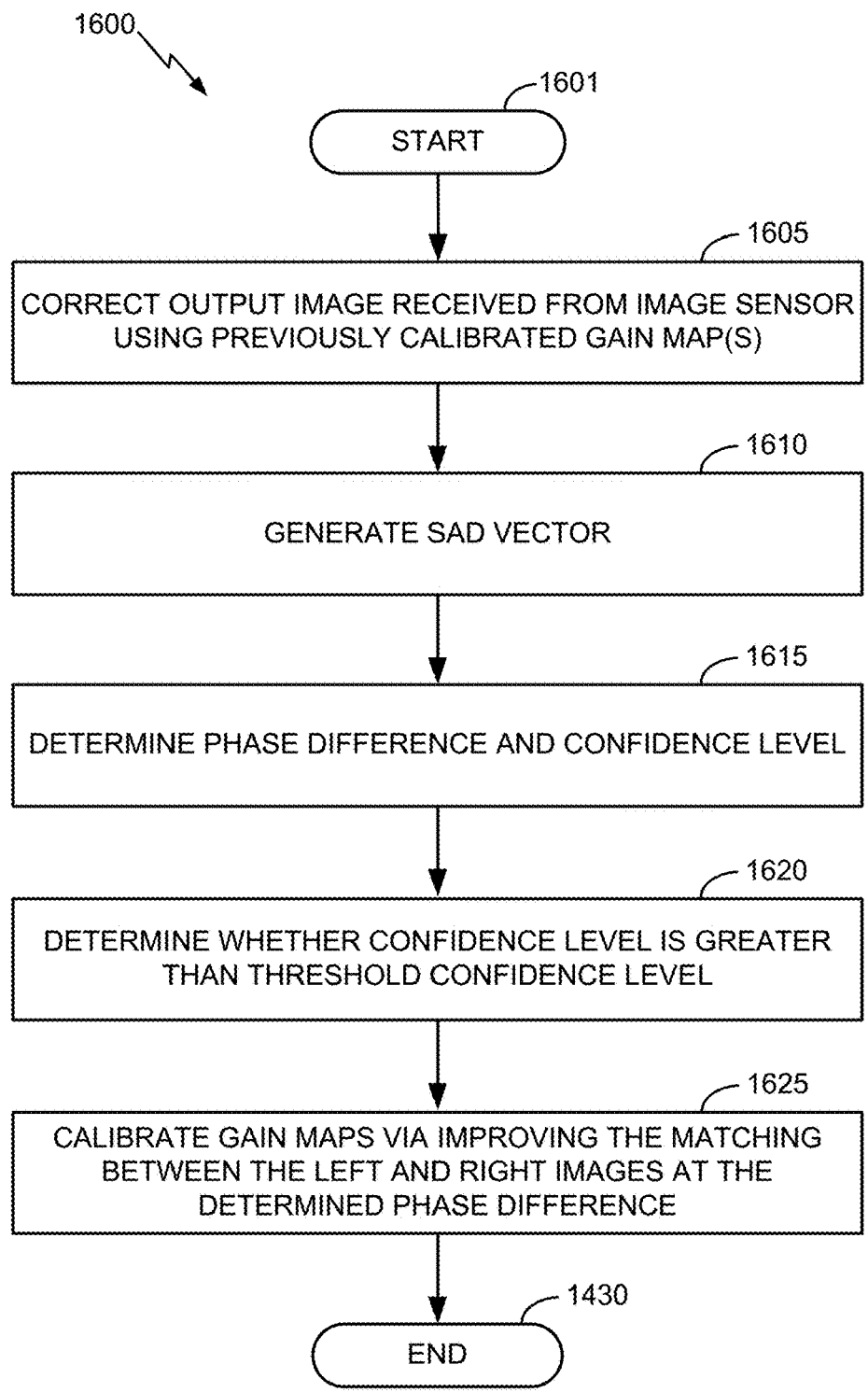
FIG. 16 is a flowchart illustrating another example method operable by an imaging device in accordance with aspects of this disclosure.

One aspect of this disclosure is the calibration of the gain maps based on the parameters determined during 2PDAF (e.g., the lens position LP, phase difference PD, and confidence level). One method 1600 for calibrating gain map(s) will be described in connection with FIGS. 16 and 17. FIG. 16 is a flowchart illustrating an example method operable by an imaging device in connection with aspects of this disclosure. The method 1600 illustrated in FIG. 16 may be operable by an imaging device 200, or component(s) thereof, for calibration of a 2PDAF process in accordance with aspects of this disclosure. For example, the steps of method 1600 illustrated in FIG. 16 may be performed by a processor 205 of the imaging device 200. For convenience, method 1600 is described as performed by the processor 205 of the imaging device 200.

Figure 17:
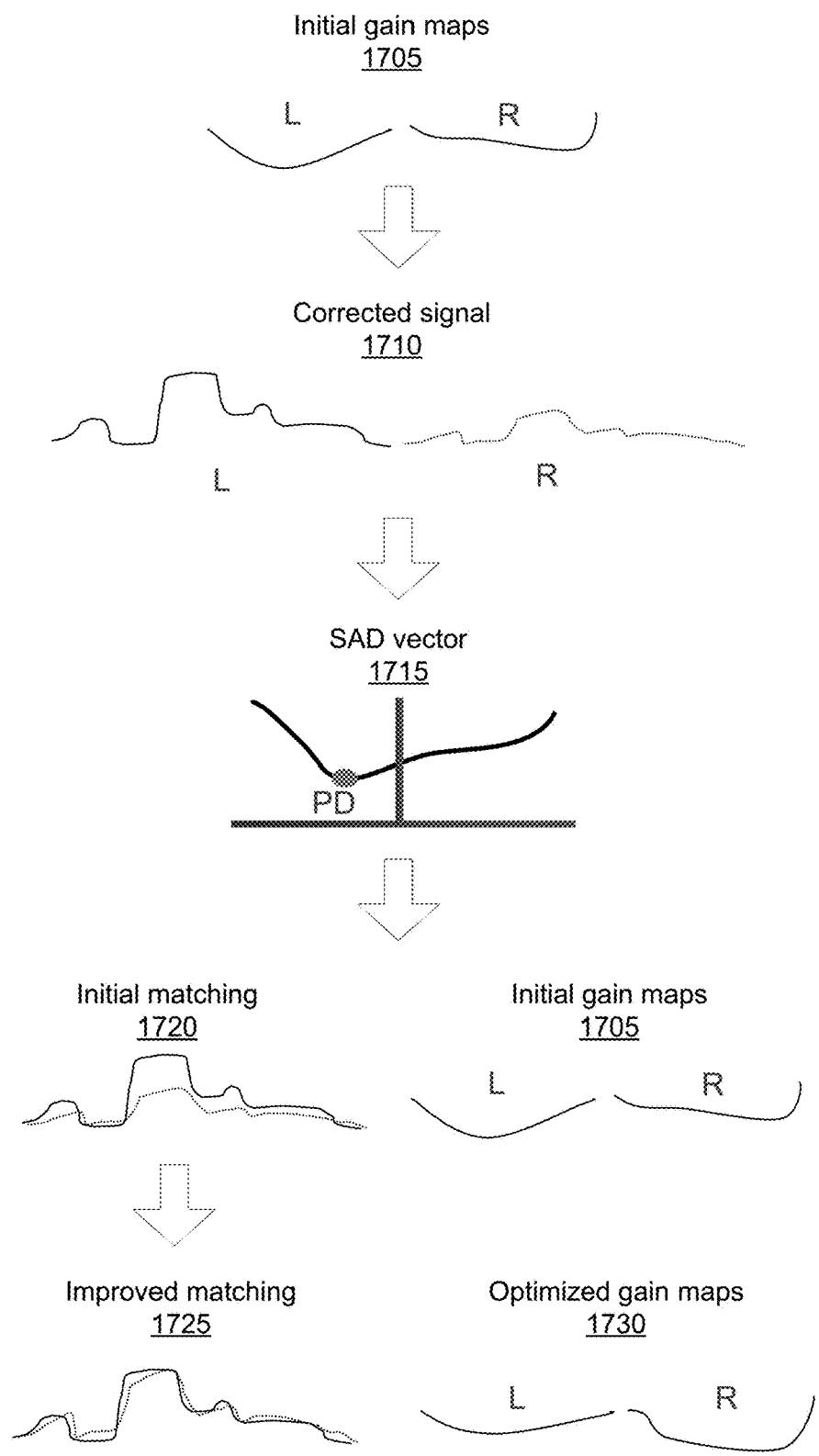
FIG. 17 is a flowchart illustrating example gain maps and corrected signals in accordance with aspects of this disclosure.

The method 1600 begins at block 1601. At block 1605, the processor 205 corrects the output data received from the image sensor 214 using previously calibrated gain map(s). For example, the processor 205 may apply the left and right gain maps to the output data received from the right and left photodiodes of each of the pixels in the image sensor 214. Example left and right gain maps are shown in FIG. 17 as initial gain maps 1705. The initial gain maps 1705 are shown in two dimensions, however, the gain maps may be implemented as three dimensional arrays as shown in FIG. 15. The corrected signal 1710 is shown below the initial gain maps 1705. The output data received from the image sensor 214 may be corrected via the application of the gain maps 1705 to produce the corrected signal 1710.

At block 1610, the processor 205 generates a SAD vector using the corrected output data. An example SAD vector 1715 is shown in FIG. 17, and includes a minimum value or phase difference PD from which the estimated lens position LP required to move the image into focus may be calculated.

At block 1615, the processor 205 may determine phase difference PD and confidence level parameters from the corrected output data and/or the SAD vector 1715. At block 1620, the processor 205 determines whether the confidence level is greater than a threshold confidence level. When the confidence level is not greater than the threshold confidence level, the current output data may not be suitable for calibration of the gain map(s).

At block 1625, the processor calibrates the gain maps via improving the matching between the left and right images at the determined phase difference. An initial matching 1720 is illustrated in FIG. 17 which shows the differences between the two corrected signals 1710 prior to performing the process of block 1625. The SAD vector 1715 calculated based on corrected signals 1710 has a minimum value representing the determined phase difference PD between the left and right images. For this phase difference PD (e.g., the pixel shift between the left and right images), the processor 205 alters the gain maps for the left and right images to reduce the SAD between the left and right images.

This may be performed using a matching algorithm to match the corresponding pixel values between the two images 1725, resulting in updated or optimized left and right gain maps 1730. These updated gain maps may be used to correct data received when capturing images using the image sensor 214. The method ends at block 1430.

Example Flowchart for Calibration of PDAF Imaging Devices

Figure 18:
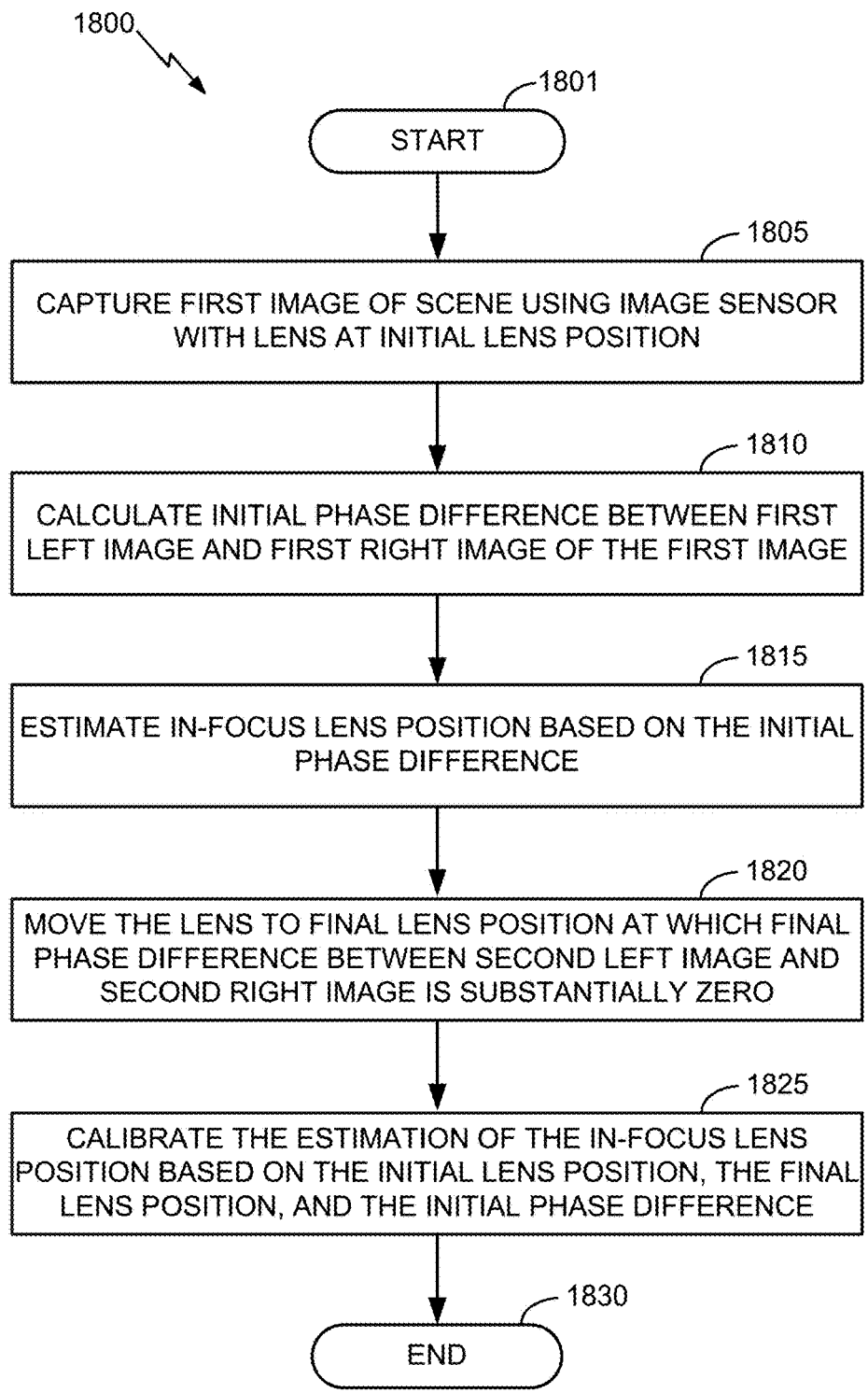
FIG. 18 is a flowchart illustrating yet another example method operable by an imaging device in accordance with aspects of this disclosure.

An exemplary implementation of this disclosure will now be described in the context of a PDAF calibration method. FIG. 18 is a flowchart illustrating an example method 1800 operable by an imaging device 200, or component(s) thereof, for calibration of PDAF in accordance with aspects of this disclosure. For example, the steps of method 1800 illustrated in FIG. 18 may be performed by a processor 205 of the imaging device 200. For convenience, method 1800 is described as performed by the processor 205 of the imaging device 200. The method 1800 may be included as part of the calibration of the PDAF process of block 530 of method 500 illustrated in FIG. 4.

The method 1800 begins at block 1801. At block 1805, the processor 205 captures a first image of a scene using an image sensor 214 with a lens 210 at an initial lens position. The image sensor 214 may include a plurality of pixels, each pixel comprising a left photodiode and a right photodiode. The first image may include a first left image captured using the left photodiodes and a first right image captured using the right photodiodes. At block 1810, the processor 205 calculates an initial phase difference between the first left image and first right image. At block 1815, the processor 205 estimates an in-focus lens position based on the initial phase difference. At block 1820, the processor 205 moves the lens 210 to a final lens position at which a final phase difference between a second left image and a second right image of a second image captured at the final lens position is substantially zero. At block 1825, the processor 205 calibrates the estimation of the in-focus lens position based on the initial lens position, the final lens position, and the initial phase difference. The method 1800 ends at block 1830.

Other Considerations

In some embodiments, the circuits, processes, and systems discussed above may be utilized in a wireless communication device, such as apparatus 100. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, and a memory including instructions or modules for carrying out the processes discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may include random-access memory (RAM), read-only memory (ROM), electrically erasable programmable read-only memory (EEPROM), flash memory or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The methods disclosed herein include one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

What is claimed is:

1. A method, operable by an imaging device comprising a lens and an image sensor comprising a plurality of pixels that each comprise a left photodiode and a right photodiode, the method comprising:
    capturing, for a first image of a scene, a first left image using the left photodiodes of each of the plurality of pixels and a first right image using the right photodiodes of each of the plurality of pixels;
    calculating a first phase difference between the first left image and the first right image;
    determining that, at a first point in time, the first phase difference is equal to a local maximum value, that a first confidence value for the first point in time exceeds a confidence value threshold, and that a first lens position for the first image is the same as a first prior lens position;
    capturing the first image of the scene at the first point in time and with the lens at the first lens position;
    estimating an in-focus lens position based on the first phase difference;
    moving the lens to a second lens position where there is a second phase difference between a second left image and a second right image for a second image of the scene;

determining that, at a second point in time, the second phase difference is less than a phase difference threshold, that a second confidence value for the second point in time exceeds the confidence value threshold, and that the second lens position is the same as a second prior lens position; and calibrating the estimation of the in-focus lens position based at least in part on the first lens position, the second lens position, and the first phase difference.

2. The method of claim 1, wherein estimating the in-focus lens position comprises multiplying the first phase difference by a calibration coefficient, and wherein calibrating the estimation of the in-focus lens position comprises:

calculating a lens position shift based on a difference between the second lens position and the first lens position, and calculating the calibration coefficient based on a difference between the lens position shift and the first phase difference.

3. The method of claim 1, further comprising:

determining a sum of absolute differences (SAD) vector between the first left image and the first right image; and determining the first phase difference based on a minimum value of the SAD vector.

4. The method of claim 3, wherein determining the SAD vector further comprises determining a SAD between the first left image and the first right image for a plurality of pixel shift values between the first left image and the first right image.

5. The method of claim 1, further comprising:

recording phase differences, lens positions, and confidence values for a predetermined period of time.

6. The method of claim 1, further comprising:

receiving an instruction from a user to begin phase detection auto focus (PDAF); and recording phase differences, lens positions, and confidence values in response to receiving the instruction.

7. The method of claim 1, further comprising:

determining a distance from the imaging device to an object in the scene; and maintaining a database of calibration coefficients each corresponding to a different distance from the object, wherein calibrating the estimation of the in-focus lens position comprises updating a calibration coefficient in the database corresponding to the determined distance.

8. The method of claim 1, further comprising:

identifying a sub-region of the first and second images containing an object in the scene for which to perform a phase detection auto focus (PDAF) process, wherein the first phase difference and the second phase difference are each calculated for the identified sub-region; and updating a database of calibration coefficients that each correspond to a different sub-regions within the first and second images, wherein calibrating the estimation of the in-focus lens position comprises updating at least one of the calibration coefficients based on a distance from the imaging device to the object.

9. An imaging device, comprising:

an image sensor comprising a plurality of pixels that each comprise a left photodiode and a right photodiode;

a lens;

at least one processor; and at least one memory communicatively coupled with the at least one processor and storing processor-readable code that, when executed by the at least one processor, causes the imaging device to:

capture, for a first image of a scene, a first left image using the left photodiodes of each of the plurality of pixels and a first right image using the right photodiodes of each of the plurality of pixels;

calculate a first phase difference between the first left image and the first right image;

determine that, at a first point in time, the first phase difference is equal to a local maximum value, that a first confidence value for the first point in time exceeds a confidence value threshold, and that a first lens position for the first image is the same as a first prior lens position;

capture the first image of the scene at the first point in time and with the lens at the first lens position;

estimate an in-focus lens position based on the first phase difference;

move the lens to a second lens position where there is a second phase difference between a second left image and a second right image for a second image of the scene;

determine that, at a second point in time, the second phase difference is less than a phase difference threshold, that a second confidence value for the second point in time exceeds the confidence value threshold, and that the second lens position is the same as a second prior lens position; and calibrate the estimation of the in-focus lens position based at least in part on the first lens position, the second lens position, and the first phase difference.

10. The imaging device of claim 9, wherein estimating the in-focus lens position comprises multiplying the first phase difference by a calibration coefficient, and wherein execution of the processor-readable code for calculating further causes the imaging device to:

calculate a lens position shift based on a difference between the second lens position and the first lens position, and calculate the calibration coefficient based on a difference between the lens position shift and the first phase difference.

11. The imaging device of claim 9, wherein execution of the processor-readable code further causes the imaging device to:

determine a sum of absolute differences (SAD) vector between the first left image and the first right image; and determine the first phase difference based on a minimum value of the SAD vector.

12. The imaging device of claim 11, wherein determining the SAD vector further comprises determining a SAD between the first left image and the first right image for a plurality of pixel shift values between the first left image and the first right image.

13. The imaging device of claim 9, wherein execution of the processor-readable code further causes the imaging device to record phase differences, lens positions, and confidence values for a predetermined period of time.

14. The imaging device of claim 9, wherein execution of the processor-readable code further causes the imaging device to:

receive an instruction from a user to begin phase detection auto focus (PDAF); and record phase differences, lens positions, and confidence values in response to receiving the instruction.

15. An imaging device comprising a lens and an image sensor comprising a plurality of pixels that each comprise a left photodiode and a right photodiode, the imaging device further comprising:
- means for capturing, for a first image of a scene, a first left image using the left photodiodes of each of the plurality of pixels and a first right image using the right photodiodes of each of the plurality of pixels;
- means for calculating a first phase difference between the first left image and the first right image;
- means for determining that, at a first point in time, the first phase difference is equal to a local maximum value, that a first confidence value for the first point in time exceeds a confidence value threshold, and that a first lens position for the first image is the same as a first prior lens position;
- means for capturing the first image of the scene at the first point in time and with the lens at the first lens position;
- means for estimating an in-focus lens position based on the first phase difference;
- means for moving the lens to a second lens position where there is a second phase difference between a second left image and a second right image for a second image of the scene;
- means for determining that, at a second point in time, the second phase difference is less than a phase difference threshold, that a second confidence value for the second point in time exceeds the confidence value threshold, and that the second lens position is the same as a second prior lens position; and
- means for calibrating the estimation of the in-focus lens position based at least in part on the first lens position, the second lens position, and the first phase difference.

16. The apparatus of claim 15, wherein estimating the in-focus lens position comprises multiplying the first phase difference by a calibration coefficient, and wherein the means for calibrating the estimation of the in-focus lens position is configured to:
- calculate a lens position shift based on a difference between the second lens position and the first lens position, and
- calculate the calibration coefficient based on a difference between the lens position shift and the first phase difference.

17. The apparatus of claim 15, further comprising:
- means for determining a sum of absolute differences (SAD) vector between the first left image and the first right image; and
- means for determining the first phase difference based on a minimum value of the SAD vector.

18. The apparatus of claim 17, wherein determining the SAD vector further comprises determining a SAD between the first left image and the first right image for a plurality of pixel shift values between the first left image and the first right image.

19. The apparatus of claim 15, further comprising means for recording phase differences, lens positions, and confidence values for a predetermined period of time.

20. The apparatus of claim 15, further comprising:
- means for receiving an instruction from a user to begin phase detection auto focus (PDAF); and
- means for recording phase differences, lens positions, and confidence values in response to receiving the instruction.

21. A non-transitory computer readable storage medium comprising instructions that, when executed by one or more processors of an apparatus comprising a lens and an image sensor comprising a plurality of pixels that each comprise a left photodiode and a right photodiode, cause the apparatus to perform a method comprising:
- capture, for a first image of a scene, a first left image using the left photodiodes of each of the plurality of pixels and a first right image using the right photodiodes of each of the plurality of pixels;
- calculate a first phase difference between the first left image and the first right image;
- determine that, at a first point in time, the first phase difference is equal to a local maximum value, that a first confidence value for the first point in time exceeds a confidence value threshold, and that a first lens position for the first image is the same as a first prior lens position;
- capture the first image of the scene at the first point in time and with the lens at the first lens position;
- estimate an in-focus lens position based on the first phase difference;
- move the lens to a second lens position where there is a second phase difference between a second left image and a second right image for a second image of the scene;
- determine that, at a second point in time, the second phase difference is less than a phase difference threshold, that a second confidence value for the second point in time exceeds the confidence value threshold, and that the second lens position is the same as a second prior lens position; and
- calibrate the estimation of the in-focus lens position based at least in part on the first lens position, the second lens position, and the first phase difference.

22. The non-transitory computer readable storage medium of claim 21, wherein estimating the in-focus lens position comprises multiplying the first phase difference by a calibration coefficient, and wherein execution of the instructions by the one or more processors of the apparatus further cause the apparatus to:
- calculate a lens position shift based on a difference between the second lens position and the first lens position, and
- calculate the calibration coefficient based on a difference between the lens position shift and the first phase difference.

23. The non-transitory computer readable storage medium of claim 21, wherein execution of the instructions by the one or more processors of the apparatus further cause the apparatus to:
- determine a sum of absolute differences (SAD) vector between the first left image and the first right image; and
- determine the first phase difference based on a minimum value of the SAD vector.

24. The non-transitory computer readable storage medium of claim 23, wherein determining the SAD vector further comprises determining a SAD between the first left image and the first right image for a plurality of pixel shift values between the first left image and the first right image.

25. The non-transitory computer readable storage medium of claim 21, wherein execution of the instructions by the one or more processors of the apparatus further cause the apparatus to record phase differences, lens positions, and confidence values for a predetermined period of time.

26. The non-transitory computer readable storage medium of claim 21, wherein execution of the instructions by the one or more processors of the apparatus further cause the apparatus to:

receive an instruction from a user to begin phase detection auto focus (PDAF); and record phase differences, lens positions, and confidence values in response to receiving the instruction.

\* \* \* \* \*